US012306388B2

(12) United States Patent
Kang et al.

(10) Patent No.: US 12,306,388 B2
(45) Date of Patent: May 20, 2025

(54) METHOD AND APPARATUS FOR CONFOCAL MICROSCOPES

(71) Applicant: Arizona Board of Regents on Behalf of the University of Arizona, Tucson, AZ (US)

(72) Inventors: Dongkyun Kang, Tucson, AZ (US); Nachiket Kulkarni, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 1046 days.

(21) Appl. No.: 17/292,524

(22) PCT Filed: Nov. 11, 2019

(86) PCT No.: PCT/US2019/060761
§ 371 (c)(1),
(2) Date: May 10, 2021

(87) PCT Pub. No.: WO2020/097606
PCT Pub. Date: May 14, 2020

(65) Prior Publication Data
US 2021/0396981 A1 Dec. 23, 2021

Related U.S. Application Data

(60) Provisional application No. 62/758,248, filed on Nov. 9, 2018.

(51) Int. Cl.
*G02B 21/00* (2006.01)
*G01J 3/02* (2006.01)
(Continued)

(52) U.S. Cl.
CPC ........ *G02B 21/0032* (2013.01); *G01J 3/0208* (2013.01); *G01J 3/04* (2013.01); *G02B 21/0052* (2013.01); *G01J 2003/1208* (2013.01)

(58) Field of Classification Search
None
See application file for complete search history.

(56) References Cited

U.S. PATENT DOCUMENTS 5,022,743 A * 6/1991 Kino .................... G02B 21/10
359/368
5,785,651 A * 7/1998 Kuhn ................... G01B 11/026
600/398
(Continued)

OTHER PUBLICATIONS

International Search Report and Written Opinion mailed Jan. 22, 2020 for International Patent Application No. PCT/US2019/060761 filed Nov. 11, 2019 (14 pages).

*Primary Examiner* — Jyotsna V Dabbi
(74) *Attorney, Agent, or Firm* — Perkins Coie

(57) ABSTRACT

Methods and system for chromatic confocal microscopy are described. One example chromatic confocal microscope system includes a hyperchromatic objective lens configured to focus the light of different wavelengths onto different corresponding focal planes that are separated from one another within a sample object, focusing optics positioned to receive multi-spectral light reflected from the sample object after passing through the hyperchromatic objective lens, a detection slit to receive light from the focusing optics and to block at least a portion of light that is incident thereon, and a grating positioned to receive light after passing through the detection slit and to produce spatially separated light of different wavelengths to enable the detection of spatially separated light by an imaging sensor. The described chromatic confocal microscopes may be used to develop low-cost chromatic confocal endoscopes for disease diagnosis of human internal organs in vivo.

23 Claims, 20 Drawing Sheets

(51) Int. Cl.
  *G01J 3/04*   (2006.01)
  *G01J 3/12*   (2006.01)

(56) References Cited

U.S. PATENT DOCUMENTS

| | | |
|---|---|---|
| 6,411,442 B1 | 6/2002 | Ota et al. |
| 2009/0109518 A1 | 4/2009 | Atkin |
| 2010/0067103 A1 | 3/2010 | Sangu |
| 2010/0097693 A1 | 4/2010 | Koga |
| 2010/0172020 A1 | 7/2010 | Price et al. |
| 2011/0096157 A1 | 4/2011 | Fine et al. |
| 2013/0258332 A1 | 10/2013 | Iga et al. |
| 2016/0357008 A1 | 12/2016 | Li et al. |
| 2017/0254641 A1 | 9/2017 | Chalmers et al. |
| 2017/0343784 A1 | 11/2017 | Wu et al. |
| 2018/0364154 A1* | 12/2018 | Wu ................ A61B 1/0638 |

* cited by examiner

METHOD AND APPARATUS FOR CONFOCAL MICROSCOPES

CROSS REFERENCE TO RELATED APPLICATIONS

This patent document is a 371 National Phase Application of International Patent Application No. PCT/US2019/060761, filed Nov. 11, 2019, which claims priority to the provisional application with Ser. No. 62/758,248, titled "Method and Apparatus for Confocal Microscopes," filed Nov. 9, 2018. The entire contents of the above noted applications are incorporated by reference as part of the disclosure of this document.

TECHNICAL FIELD

The subject matter of this patent document relates to confocal imaging systems, and specifically chromatic confocal microscopy devices and methods.

BACKGROUND

Since their invention in the 1950s, confocal microscopes have been extensively investigated to provide better imaging performance for applications that range from metrology to tissue imaging. In its basic configuration, a confocal microscope is a point imaging system that includes a pinhole to block out the light outside of the focused spot before reaching a detector. This is also a major limitation of the confocal microscope, as a lateral scanning mechanism is needed to axially scan the pinhole across the object to obtain a 2-dimensional (2D) confocal image.

Obtaining images from different depths within an object can be useful for constructing 3-dimensional (3D) images, and for disease diagnosis because some of the key cellular features can change as a function of depth. Conducting mechanical axial scanning to acquire such images at different depth has several disadvantages, including challenges in implementing precision translation components in small areas, as required, for example, in endoscopes, and the extra cost and reduced reliability associated with implementation of moving components.

SUMMARY OF CERTAIN EMBODIMENTS

The confocal chromatic microscope systems and methods disclosed herein, among other features, benefits and applications, may be used to develop low-cost chromatic confocal endoscopes for disease diagnosis of human internal organs in vivo, including cervix, anus, esophagus, stomach, duodenum, and colon. The low cost of the device can facilitate wide adaption of the device in various clinical settings, including primary-care clinics, remote-area hospitals, and battle-field clinics.

One example chromatic confocal microscope system includes a hyperchromatic objective lens, and collimating optics positioned to received light from a light source, to collimate the light of different wavelengths from the light source and to deliver the collimated light to the hyperchromatic objective lens. The hyperchromatic objective lens is configured to focus the light of different wavelengths onto different corresponding focal planes that are separated from one another within a sample object. The chromatic confocal microscope further includes focusing optics positioned to receive multi-spectral light reflected from the sample object after passing through the hyperchromatic objective lens, a detection slit positioned to receive light from the focusing optics and to block at least a portion of light that is incident thereon, and a grating positioned to receive light after passing through the detection slit and to produce spatially separated light of different wavelengths to enable the detection of spatially separated light by an imaging sensor.

DETAILED DESCRIPTION

Figure 1:
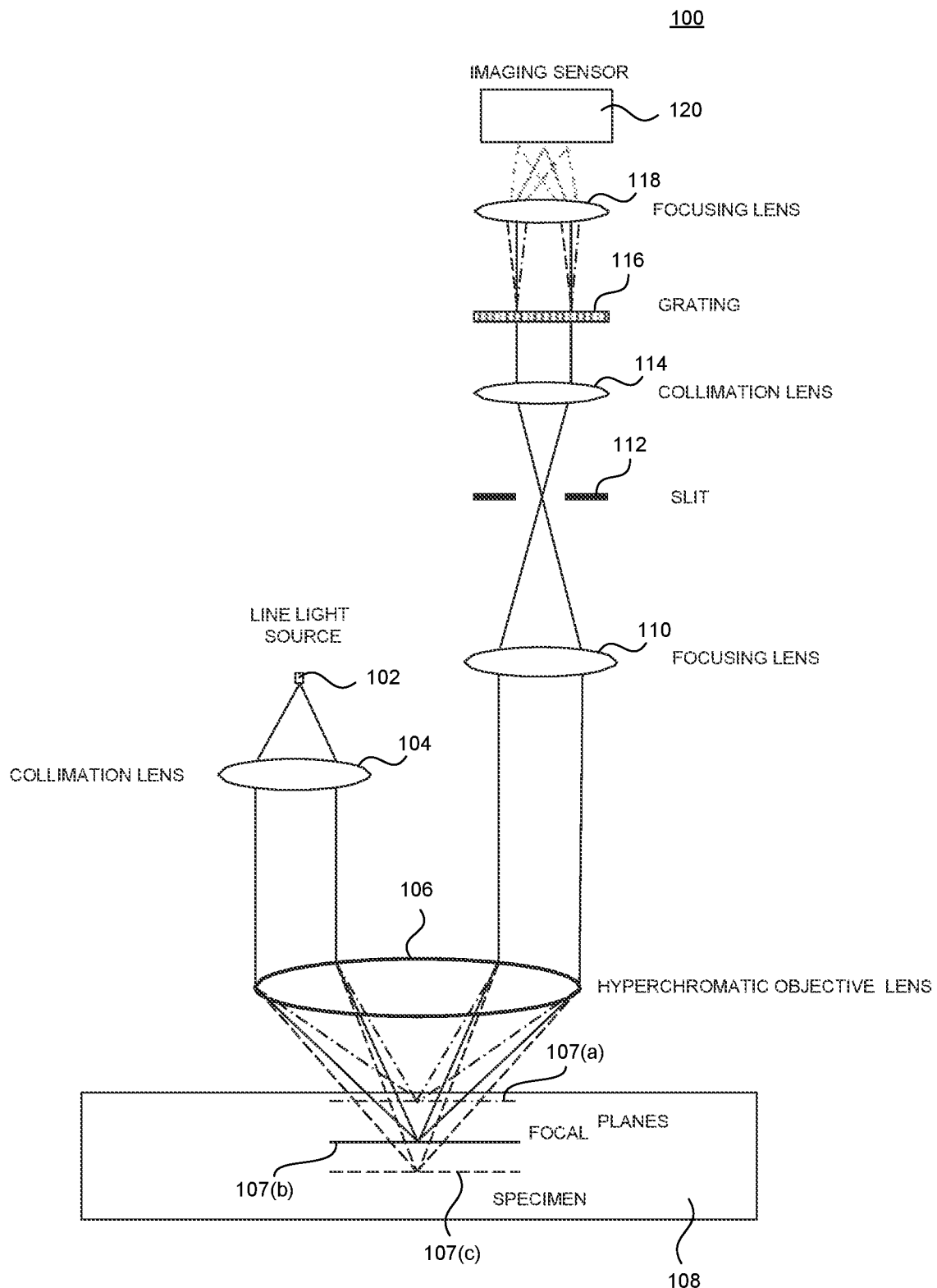
FIG. 1 illustrates a chromatic confocal microscope system in accordance with an example embodiment.

In confocal microscopes and confocal endoscopes, multiple images (e.g., en face images) can be acquired at different imaging depths while axially translating the confocal microscope relative to the specimen. Acquiring images from different imaging depths can be useful for disease diagnosis since some of the key cellular features can change as a function of depth, including cellular density and nuclear-to-cytoplasm ratio. This approach of conducting mechanical axial scanning, however, can have difficulties such as in confocal endoscopic imaging of human internal organs, since 1) implementing a precision translation mechanism is challenging in a small endoscope and 2) tissue movement can hamper accurate placement of the imaging depth.

Chromatic confocal microscopy can use longitudinal chromatic aberration of the microscope optics to generate different focal planes for different wavelengths and generate cross-sectional confocal images of the specimen without conducting axial scanning of the objective lens. A chromatic confocal microscopy can be used to implement clinically-viable endoscopic devices. For example, in some cases, a confocal microscope may incorporate a commercially-available objective lens and multiple relay lenses to generate longitudinal chromatic aberrations. Since commercially-available objective lenses are generally corrected for chromatic aberrations, multiple relay lenses that are not corrected for chromatic aberrations need to be used in conjunction with the commercially-available objective lenses to generate different focal points for different wavelengths. In this configuration, the input beams into the commercially-available objective lenses are not collimated for most of the wavelengths. For example, the beam needs to be diverging for a particular wavelength to place the focal point of that particular wavelength farther away from the objective lens, and the beam needs to be converging for another wavelength to place the focal point for another wavelength closer to the objective lens. This leads to spherical aberrations for these uncollimated wavelengths and can degrade the image quality. In some cases, the use of multiple lenses can also make this approach less suitable for endoscopic applications.

In other chromatic confocal approaches, a diffractive optical element (e.g. Fresnel lens) may be used to generate longitudinal chromatic aberrations. While the diffractive optical element approach can provide a simpler way of generating longitudinal chromatic aberrations, in some instances the resulting longitudinal chromatic aberration is not favorable for human tissue imaging since the shorter wavelengths are focused deeper into the tissue and the longer wavelengths into the superficial region of the tissue. Scattering by the tissue can be higher for shorter wavelengths and therefore it can be desirable to image shallow regions of the tissue with shorter wavelengths and deeper regions with longer wavelengths.

Methods and apparatus for a chromatic confocal microscope are disclosed herein. The chromatic confocal microscope may use a hyperchromatic objective lens. In some embodiments, the light beam entering the hyperchromatic objective lens is generally collimated for the entire imaging spectrum, which can result in low spherical aberration, so that imaging performance may be improved. In some embodiments, an aspheric singlet may be used as the objective lens. In other embodiments, an aspheric singlet may be one of two lens elements of the objective lens. Advantageously, the use of fewer components for the objective lens may reduce the cost, size, and complexity of the microscopy optics, which can make the chromatic confocal microscope system suitable for endoscopic devices.

In some embodiments, the chromatic confocal microscope may consist of a hyperchromatic objective lens, illumination optics, and detection optics. FIG. 1 illustrates a chromatic confocal microscope 100 in accordance with an example embodiment. Light from a light source 102 (e.g., a line light source) can be collimated by a collimation lens 104 and can illuminate a first section (e.g., approximately half) of the objective lens 106 pupil. In some embodiments, the objective lens 106 is an aspheric singlet made with a high-dispersion material (e.g., glass), which provides high numerical aperture and/or high longitudinal chromatic aberration (e.g., simultaneously). For example, the numerical aperture for the high dispersion material (e.g., glass) may be between about 0.4 and about 0.8, and in some cases between about 0.6 and about 0.7, although values outside these ranges could be used in some implementations.

In example embodiments, the confocal microscope (e.g., the objective lens and/or the illumination optics thereof) can be configured to produce longitudinal chromatic aberration of about 50 μm, about 60 μm, about 70 μm, about 80 μm, about 90 μm, about 100 μm, about 110 μm, about 125 μm, about 150 μm, about 175 μm, about 200 μm, about 225 μm, about 250 μm, or any values therebetween, or ranges bounded therein, although other values could be used depending on the desired application. The chromatic aberration can be measured as the difference between the focal lengths of the minimum and maximum wavelengths of light used by the confocal microscope. For example, the light source 102 can output light at multiple wavelengths (e.g., broadband light across a range of wavelengths). In some cases, the confocal microscope can use light having wavelengths between about 500 nm and about 700 nm. The objective lens 106 can be configured to produce the chromatic aberration values and ranges listed above for collimated input light with a wavelength range of about 500 nm to about 700 nm. That same objective lens 106 could produce different chromatic aberration values if different wavelength ranges were used. In example embodiments, the light source 102 can output light having a wavelength of about 400 nm, about 450 nm, about 500 nm, about 550 nm, about 600 nm, about 650 nm, about 700 nm, about 750 nm, about 800 nm, about 1000 nm, about 1100 nm, about 1200 nm, about 1300 nm, about 1400 nm, about 1500 nm, or any values therebetween, or any ranges bounded by any combination of these values, although other wavelengths could be used in some implementations. The confocal microscope can use visible light and/or near infrared light, in some embodiments.

Referring back to FIG. 1, the objective lens 106, in some embodiment, can be an aspheric singlet that is produced at low cost through glass molding processes, which can help reduce the endoscope cost. The objective lens 106 can focus different wavelengths into lines at different focal planes of the specimen 108, due to the chromatic aberration produced by the objective lens 106. As a result, each imaging depth of the tissue is illuminated with and encoded with a specific wavelength or range of wavelengths. In FIG. 1, three different focal planes, 107(a), 107(b), 107(c), at three different depths within the specimen are shown for illustrative purposes. Light reflected from the specimen 108 (e.g., tissue)— at different wavelengths of light reflected from different depths of the tissue—can be imaged or otherwise analyzed. In the example embodiment of FIG. 1, light reflected from a tissue or specimen 108 is collected and collimated by at least a section of the objective lens 106. The collimated light is then focused by a focusing lens 110 on a detection slit 112, where light from out-of-focus planes for each wavelength is mostly rejected. Light filtered by the detection slit 112 is then collimated by another collimation lens 114 onto a diffraction grating 116. The diffracted light is then focused by another focusing lens 118 on an imaging sensor 120. The imaging sensor 120 can detect the spectrum of the light reflected from the tissue or specimen 108. As the imaging depth is encoded with wavelength by the hyperchromatic objective lens 106, the spectrum captured by the imaging sensor 120 represents the cross-sectional image of the tissue or specimen 108 positioned at a particular distance from the top of the specimen 108. The use of the slit aperture 112 enables two-dimensional confocal imaging without using a scanning method that requires movable objects. Various alternative imaging optical components can be used. For example, a pinhole aperture can be used in some implementations, in place of the detection slit, which may necessitate additional scanning components.

The disclosed hyperchromatic objective lens can focus different wavelengths of light into different focal planes while achieving a sufficiently large diffraction-limited field of view (FOV). An example hyperchromatic lens can use a high refractive index glass K-PSFN2 (available through Sumita Optical Glass, Inc). The refractive index of this glass at 600 nm is 1.99 and it has an Abbe number 20.66. However, a glass with an Abbe number anywhere between about 10 and about 60 may generally be used.

Figure 2A:
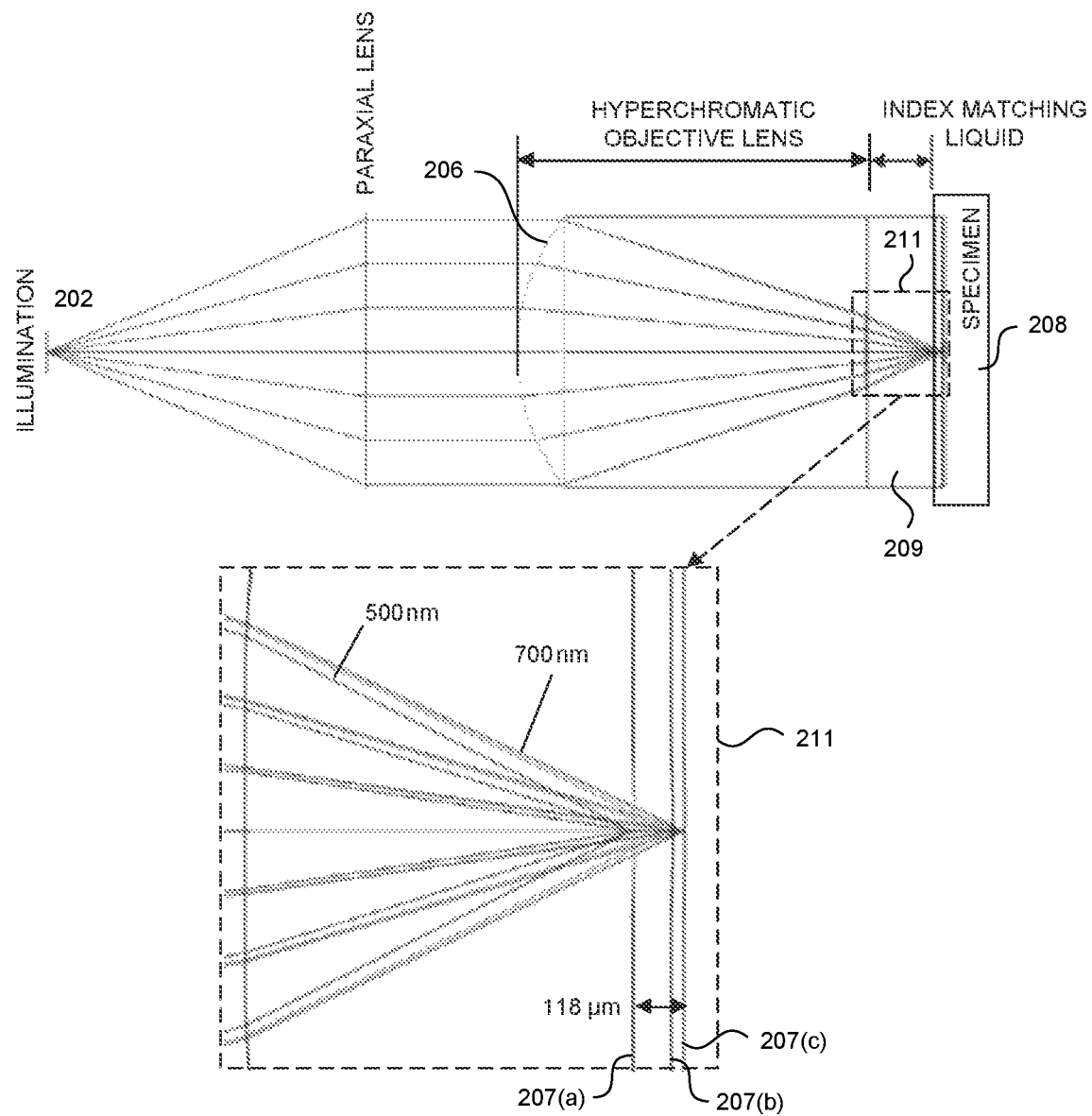
FIG. 2A illustrates a hyperchromatic lens in accordance with an example embodiment.
Figure 2B:
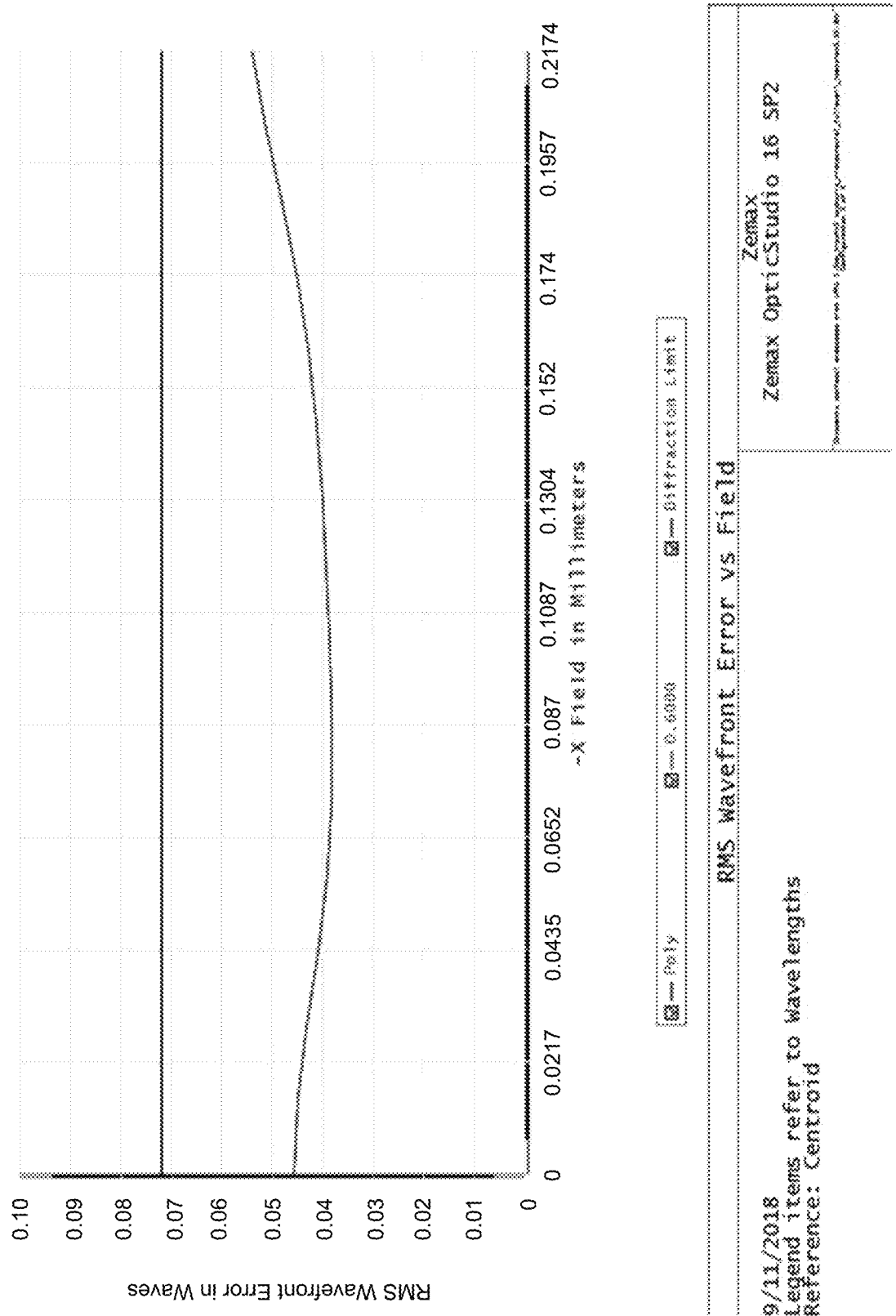
FIG. 2B illustrates an example root mean square wavefront error plot associated with the example hyperchromatic lens of FIG. 2A.

FIGS. 2A and 2B illustrate an example design of a hyperchromatic lens, which achieves an imaging depth range of 118 μm for the spectrum of 500-700 nm, while achieving numerical aperture of 0.6 and diffraction-limited FOV of 434 μm. FIG. 2A illustrates an illumination source 202, a singlet hyperchromatic objective 206, a region of index matching fluid 209 that is in contact with the specimen 208. Light in the range 500-700 nm are focused onto different depths of the specimen 108, as shown in the magnified inset 211 region, with three illustrative focal planes 207(a), 207(b), 207(c), for different wavelengths. FIG. 2B illustrates the RMS wavefront error versus field for the hyperchromatic lens of FIG. 2A.

The hyperchromatic lens can have a 4-mm diameter, a sufficiently small dimension for endoscopic applications. The lens may have a focal length between 4 mm and 8 mm. The lens may have two aspherical surfaces and can be through a glass molding process to enable production at low cost. The objective lens can include a single lens element, in some embodiments. In some embodiments, the objective lens can include a biconvex lens element, a plano-convex lens element, or a positive meniscus lens element.

Various different lens designs can be used that produce the following example ranges and values. The refractive index of the objective lens can be about 1.3, about 1.4, about 1.5, about 1.6, about 1.7, about 1.8, about 1.9, about 2.0, about 2.1, about 2.2, about 2.3, about 2.4, or any values therebetween, or any ranges bounded therein. The objective lens can have an Abbe number of about 10, about 15, about 20, about 25, about 30, about 35, about 40, about 45, about 50, about 55, about 60, or any values therebetween, or any ranges bounded therein. The objective lens for the confocal microscope can provide an FOV of about 100 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 900 μm, about 1000 μm, or any values therebetween, or any ranged bounded therein. The objective lens can provide a focal length of about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, about 8.5 mm, about 9 mm, about 9.5 mm, about 10 mm, or any values therebetween, or any ranges bounded therein. The focal length can be the average focal length for light in the visible spectrum and/or for light provided by the light source of the confocal microscope. The objective lens can have a diameter of about 2 mm, about 2.5 mm, about 3 mm, about 3.5 mm, about 4 mm, about 4.5 mm, about 5 mm, about 5.5 mm, about 6 mm, about 6.5 mm, about 7 mm, about 7.5 mm, about 8 mm, or any values therebetween, or any ranges bounded therein. In some implementations, other objective lenses can be used, such as having parameters outside the ranges that are specifically discussed herein, depending on the application. For example, in some uses, larger scale objective lenses can be used.

Figure 3A:
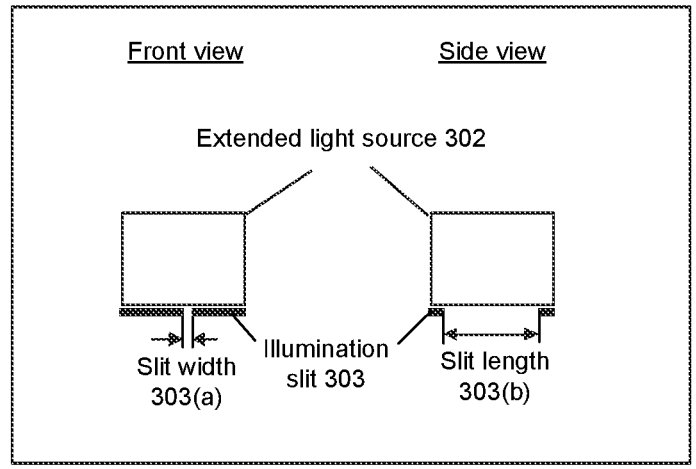
FIG. 3A illustrates a configuration for producing a line light source in accordance with an example embodiment.
Figure 3B:
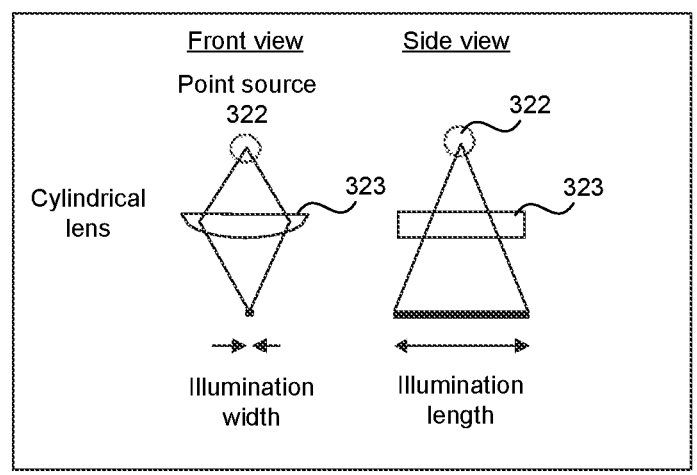
FIG. 3B illustrates another configuration for producing a line light source in accordance with an example embodiment.

FIGS. 3A and 3B illustrate two example embodiments of implementing a line light source that can be used in the disclosed confocal microscopes. FIG. 3A, illustrates an embodiment where light from an extended light source 302 is filtered by an illumination slit 303, having a slit width 303(a) and a slit length 303(b), as illustrated in the front and side views of FIG. 3A, respectively. Low-cost sources, including light emitting diodes (LEDs), fluorescent bulbs, and halogen lamps, may be used as the extended light source. FIG. 3B illustrates an embodiment where a point source 322 is focused through a cylindrical lens 323 to produce a line illumination having a narrow illumination width and a long illumination length, as illustrated in the front and side views of FIG. 3B, respectively. In some embodiments, a laser diode, superluminescent diode (SLD), or supercontinnum source may be used as the point source.

Figure 4:
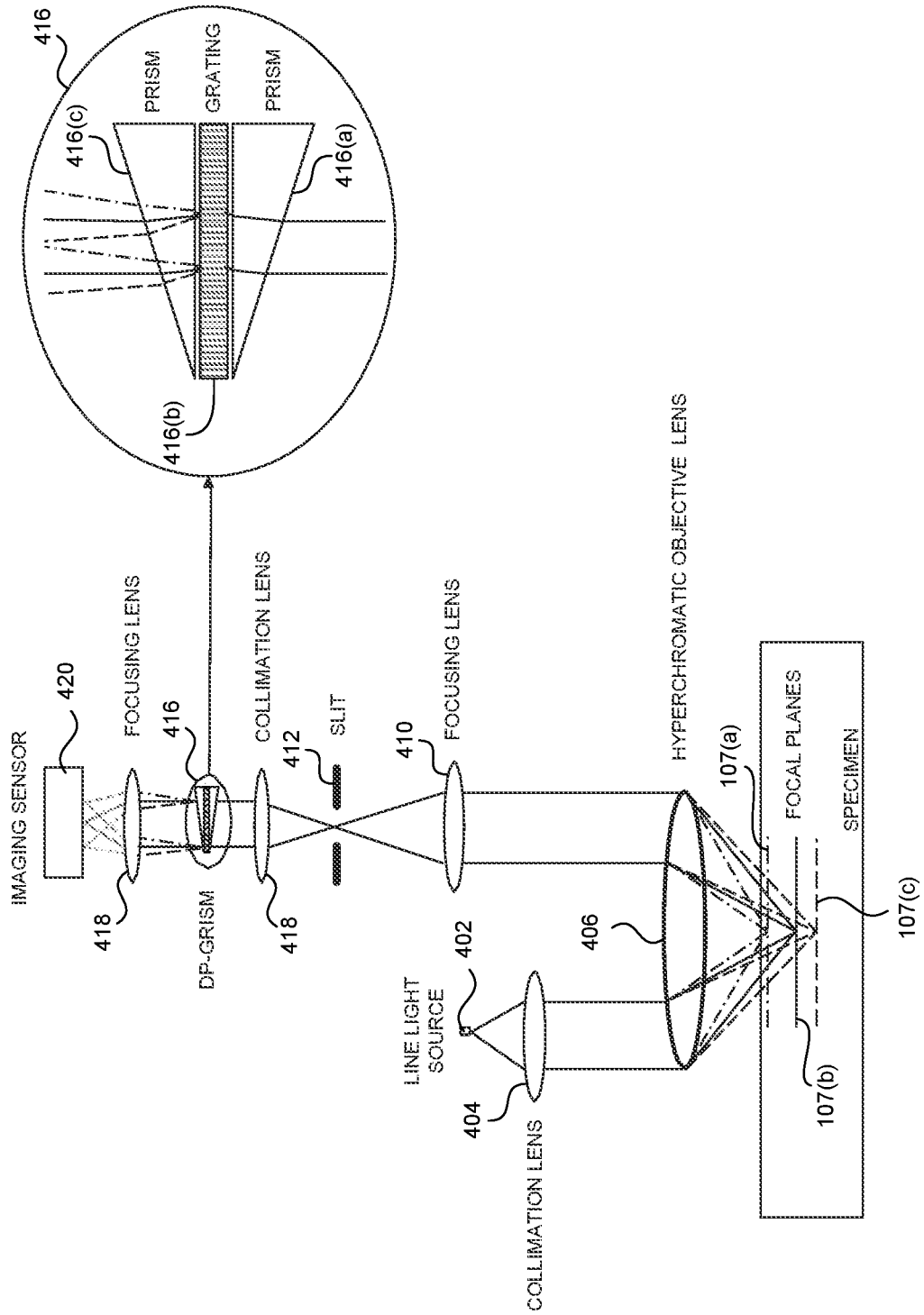
FIG. 4 illustrates a chromatic confocal microscope system including a double prism (DP) GRISM in accordance with an example embodiment.

FIG. 4 illustrates an example embodiment of a chromatic confocal microscope system with a double-prism (DP) GRISM (a combination of a grating and a prism). The confocal microscope of FIG. 4 includes similar components as those in FIG. 1, namely, a light source 402, a first collimation lens 404, a hyperchromatic objective 406 that focuses light of different wavelengths onto different focal planes 407(a), 407(b), 407(c) in a specimen 408. The confocal microscope of FIG. 4 further includes focusing lens 410, a slit 412, a second collimation lens 414, focusing lens 418 and an imaging sensor 420. The confocal microscope of FIG. 4, however, includes a DP GRISM 416 (inset). The incoming beam at the DP GRISM 416 is refracted by the first prism 416(a) so that the incidence angle on the grating is set to an angle that maximizes the diffraction efficiency of the grating. Light diffracted by the grating 416(b) may then be refracted by the second prism 416(c) before the beam exits the DP GRISM 416 so that one of the exiting beams is substantially coaxial to the incoming beam. Advantageously, the use of the DP GRISM 416 facilitates integration of the imaging sensor inside the small endoscope.

Figure 5:
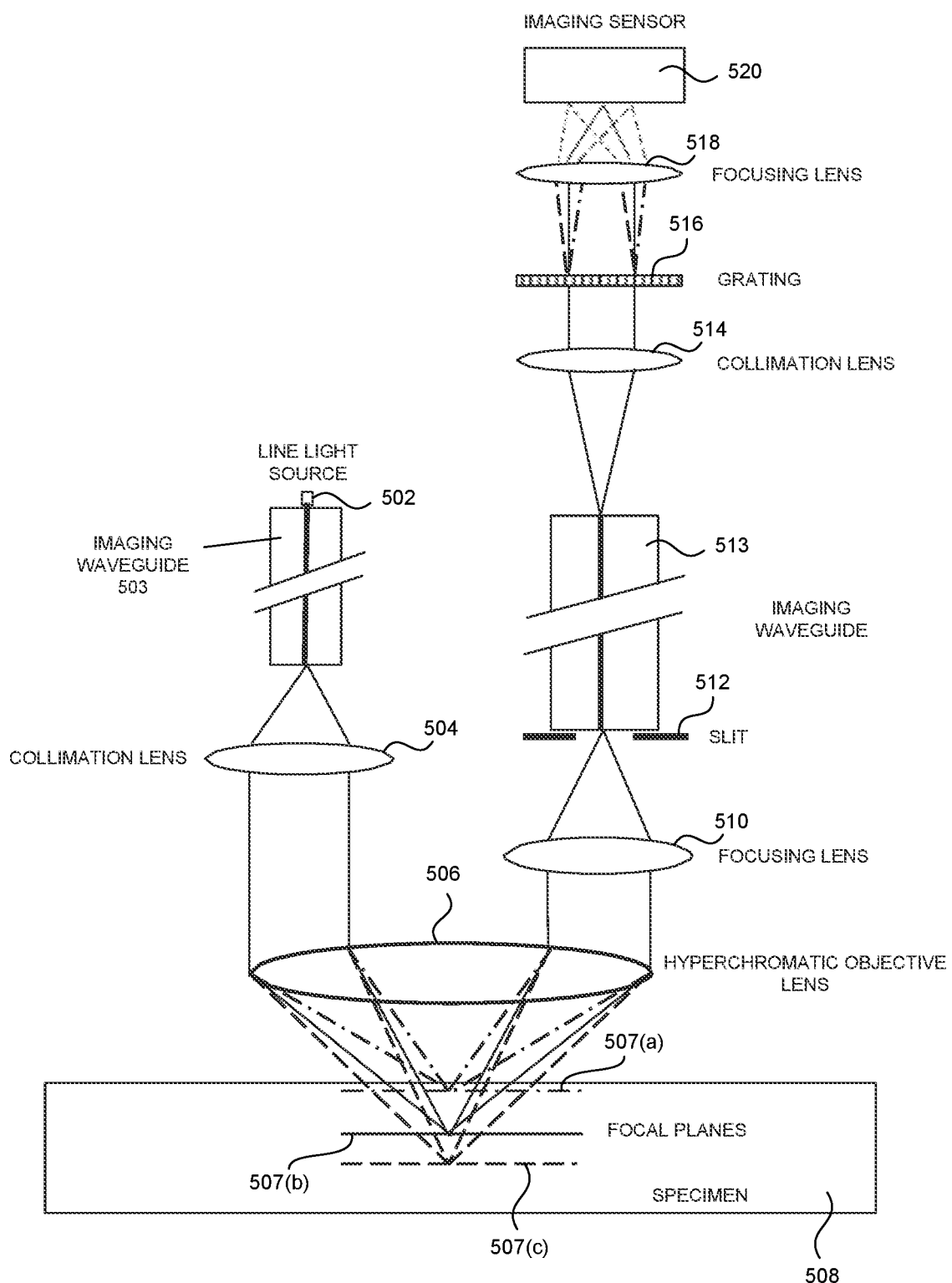
FIG. 5 illustrates a chromatic confocal microscope system including imaging waveguides in illumination and detection arms in accordance with an example embodiment.

FIG. 5 illustrates an example embodiment of a chromatic confocal microscope system with imaging waveguides in the illumination and detection arms. The confocal microscope of FIG. 5 includes similar components as those in FIG. 1, namely, a light source 502, a first collimation lens 504, a hyperchromatic objective 506 that focuses light of different wavelengths onto different focal planes 507(a), 507(b), 507(c) in a specimen 508. The confocal microscope of FIG. 5 further includes focusing lens 510, a slit 512, a second collimation lens 514, a grating 516, a second focusing lens 518 and an imaging sensor 520. The confocal microscope of FIG. 5, however, can include one or more illumination waveguides 503, 513. In the illumination arm, light may be passed through an imaging waveguide 503, such as an imaging fiber bundle, and collimated using the collimation lens 504. The imaging waveguide 503 can deliver the line illumination from the line light source to the distal end of the imaging waveguide 503. In some embodiments, reflected light from the specimen 508 may be focused by the objective lens 506 and focusing lens 510 and filtered by the slit 512 before the light is coupled to the second imaging waveguide 513. The reflected light may then be delivered outside the system and coupled a spectrometer (not shown). Advantageously, use of the two imaging waveguides can facilitate the miniaturization of the distal optics for endoscopic applications.

Figure 6:
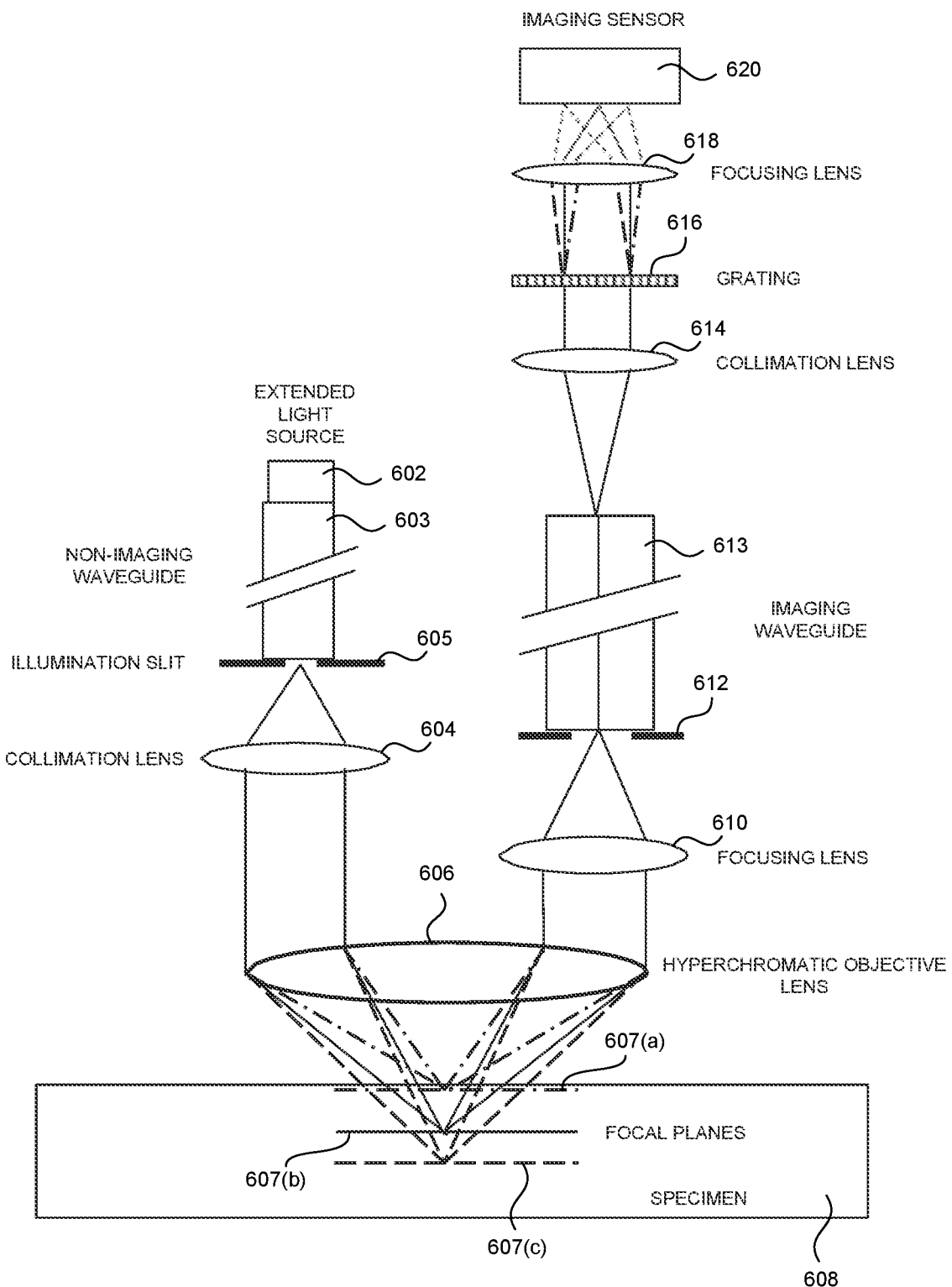
FIG. 6 illustrates a chromatic confocal microscope system including a non-imaging waveguide in accordance with an example embodiment.

FIG. 6 illustrates another example embodiment of a chromatic confocal microscope system. The confocal microscope of FIG. 6 includes similar components as those in FIG. 1, namely, a first collimation lens 604, a hyperchromatic objective 606 that focuses light of different wavelengths onto different focal planes 607(a), 607(b), 607(c) in a specimen 608. The confocal microscope of FIG. 6 further includes a first focusing lens 610, a slit 612 in the imaging arm, a second collimation lens 614, a grating 616, a second focusing lens 618 and an imaging sensor 620. The confocal microscope of FIG. 6, however, similar to the configuration of FIG. 4 includes an imaging waveguide 613 in the imaging arm. Further, illumination light from an extended light source 603 is delivered to the distal optics through a non-imaging waveguide 603, such as a multi-mode fiber, and is filtered by an illumination slit 605.

Figure 7:
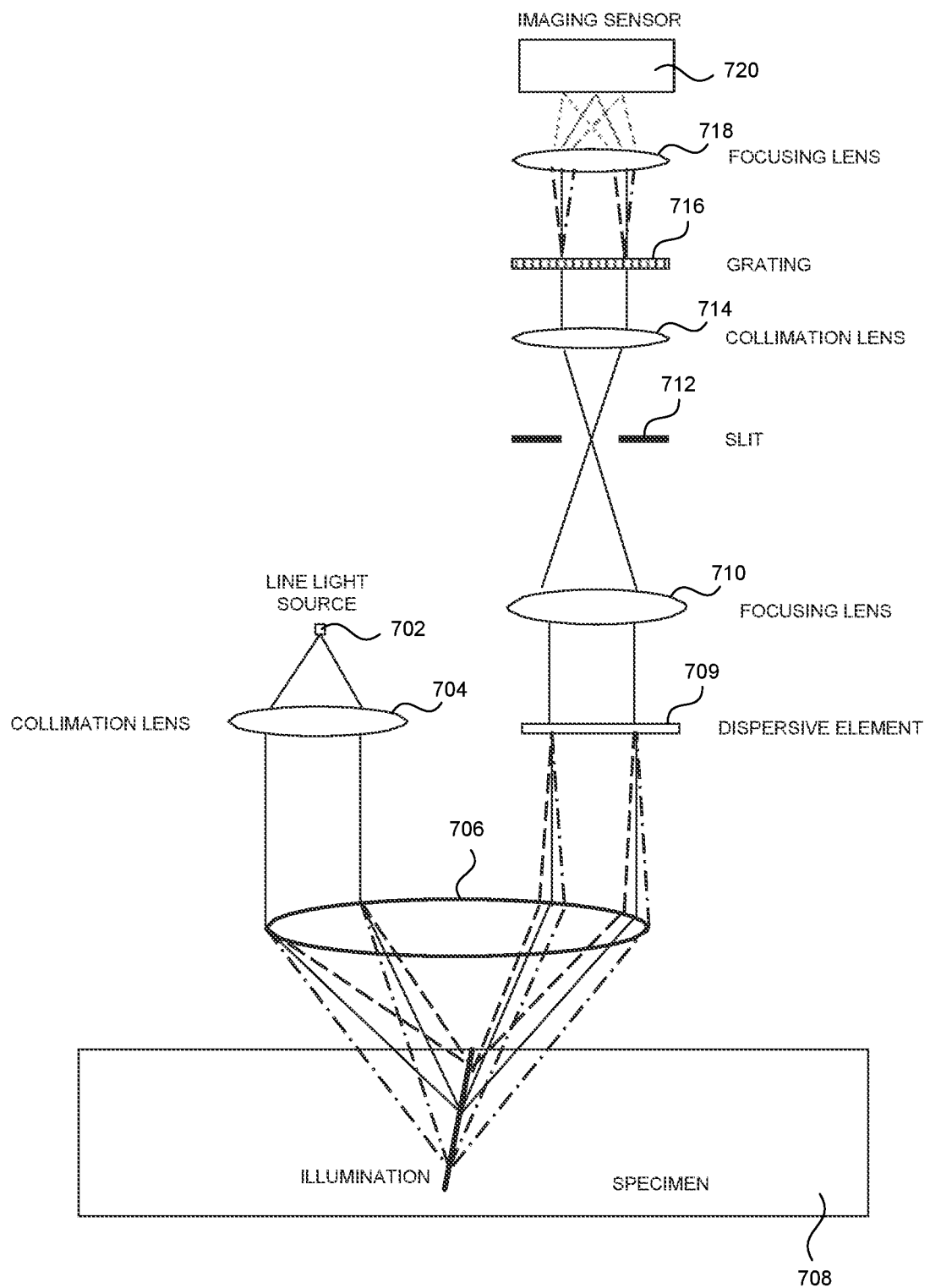
FIG. 7 illustrates a chromatic confocal microscope system having an illumination field of view that is not parallel to the optical axis in accordance with an example embodiment.

FIG. 7 illustrates an example embodiment of another chromatic confocal microscope system, where an illumination field of view is not parallel to the optical axis. The confocal microscope of FIG. 7 includes similar components as those in FIG. 1, namely, a light source 702, a first collimation lens 704, a hyperchromatic objective 706 that focuses light of different wavelengths onto different focal planes 707(a), 707(b), 707(c) in a specimen 708. However, as illustrated in FIG. 7, the beams with different wavelengths come to focus at a tilted angle within the specimen 708, when, for example, the collimation lens has non-negligible chromatic aberrations. In order to focus light beams originating from a tilted FOV into a single line on the detection slit 712, a dispersive element 709 may be used. The dispersive element 709 corrects for the angle deviations between collimated light beams of different wavelengths and makes all the wavelengths propagate substantially parallel to each other. The dispersive element 709 may be a grating or prism. The remaining components of FIG. 7 are similar to those in FIG. 1 and include a first focusing lens 710, the aforementioned detection slit 712, a grating 716, a second collimation lens 714, a second focusing lens 718 and an imaging sensor 720.

Figure 8:
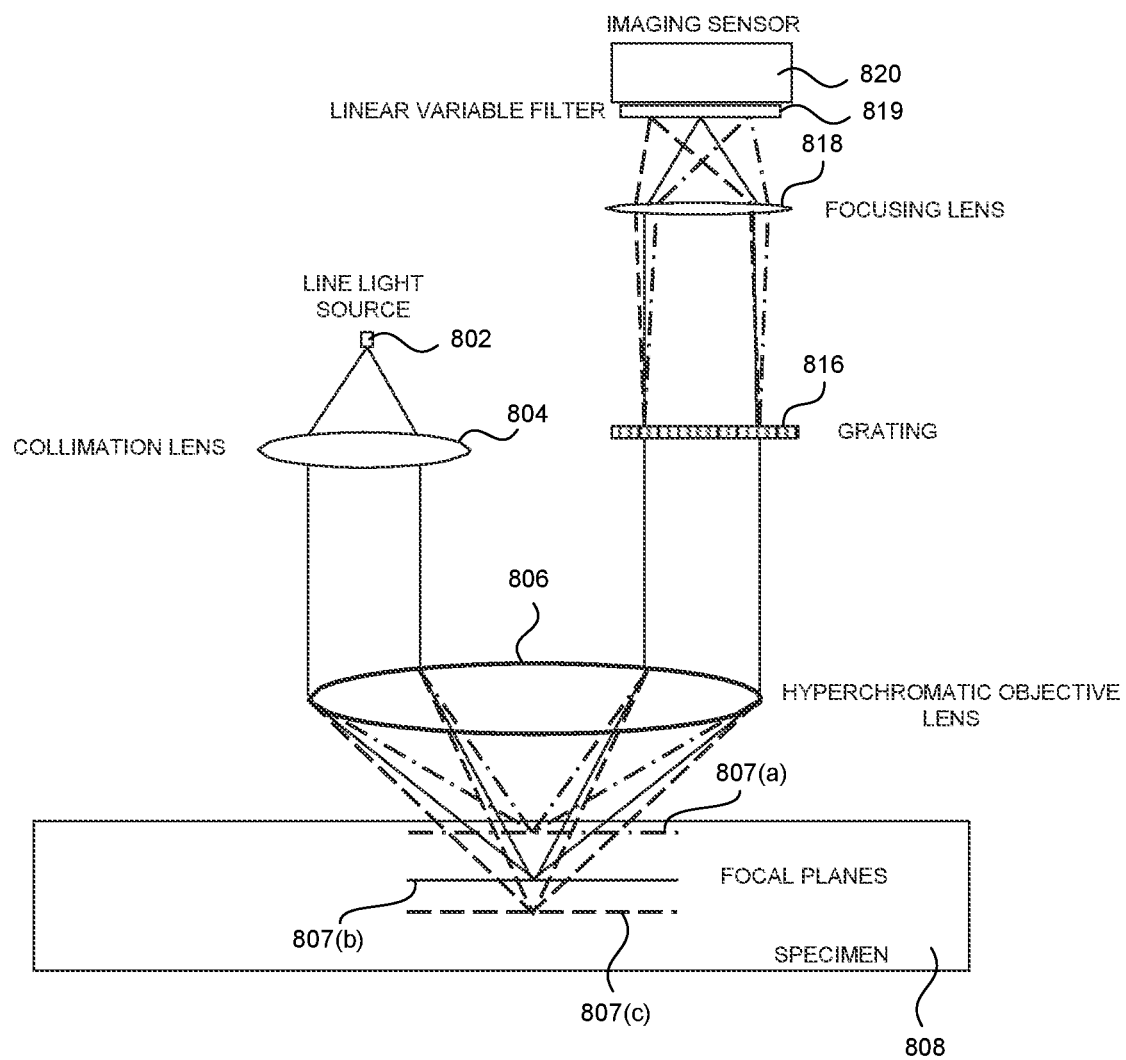
FIG. 8 illustrates a chromatic confocal microscope system including a linear variable filter in accordance with an example embodiment.

FIG. 8 illustrates another example embodiment of a chromatic confocal microscope system, where a linear variable filter is used to simplify the confocal detection optics. Some of the components in the confocal microscope of FIG. 8 are similar to those in FIG. 1, namely, a light source 802, a collimation lens 804, a hyperchromatic objective 806 that focuses light of different wavelengths onto different focal planes 807(a), 807(b), 807(c) in a specimen 808. In the detection arm, however, the collimated beam received from the objective 806 is received by a grating 809 and is diffracted to generate a spectrum of the beam that is focused by the focusing lens 818, onto a linear variable filter 819, and on the imaging sensor 820. The linear variable filter 819 includes a series of different spectral filters positioned across the linear variable filter, where each spectral filter allows spectral components within only a specific narrow band to pass therethrough at the corresponding spatial location of the linear variable filter 819. In this way, before the spectrum is detected by the imaging sensor 820, the linear variable filter 819 permits a narrow band of the spectrum to pass. Passband of each detection point of the imaging sensor 820 is matched to the spectrum of the illumination light that produces a focal point that is conjugate to the detection point.

Figure 9:
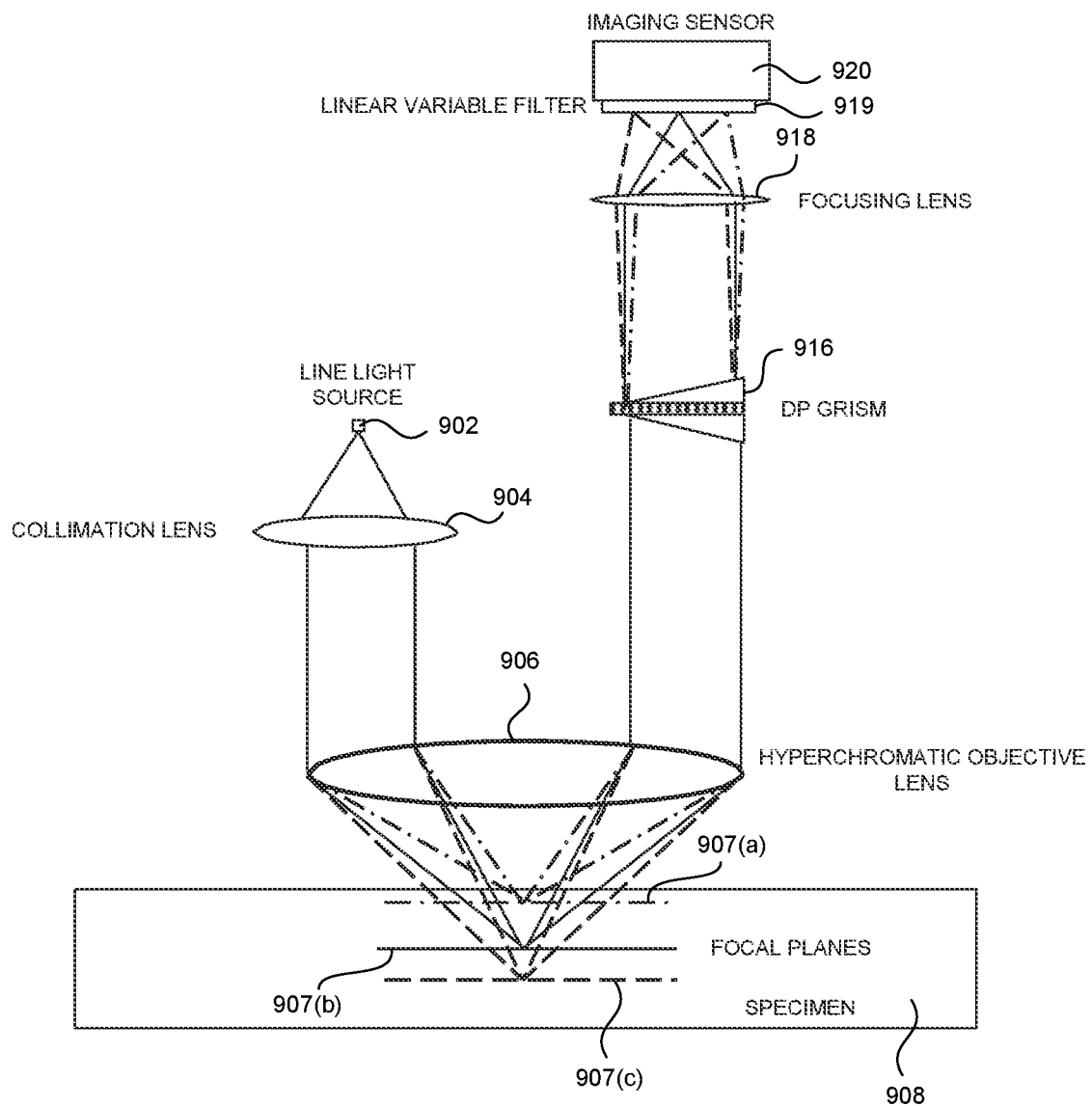
FIG. 9 illustrates a chromatic confocal microscope system with a DP GRISM and a linear variable filter in accordance with an example embodiment.

FIG. 9 illustrates another example of a chromatic confocal microscope system, where a DP GRISM is used in conjunction with the linear variable filter. In particular, the confocal microscope of FIG. 9 includes some components that are similar to those in FIGS. 1, 4 and 8, namely, a light source 902, a collimation lens 904, a hyperchromatic objective 906 that focuses light of different wavelengths onto different focal planes 907(a), 907(b), 907(c) in a specimen 908. The confocal microscope of FIG. 9 further includes a DP GRISM 916 that is similar to the DP GRISM 416 of FIG. 4, and a linear variable filter 919 similar to FIG. 8. Advantageously, the DP GRISM 916 eases coaxial configuration of the focusing lens 918, linear variable filter 919, and imaging sensor 920 relative to the optical axis of the objective lens 906 and facilitates inclusion of the spectrometer optics inside the endoscope.

Figure 10:
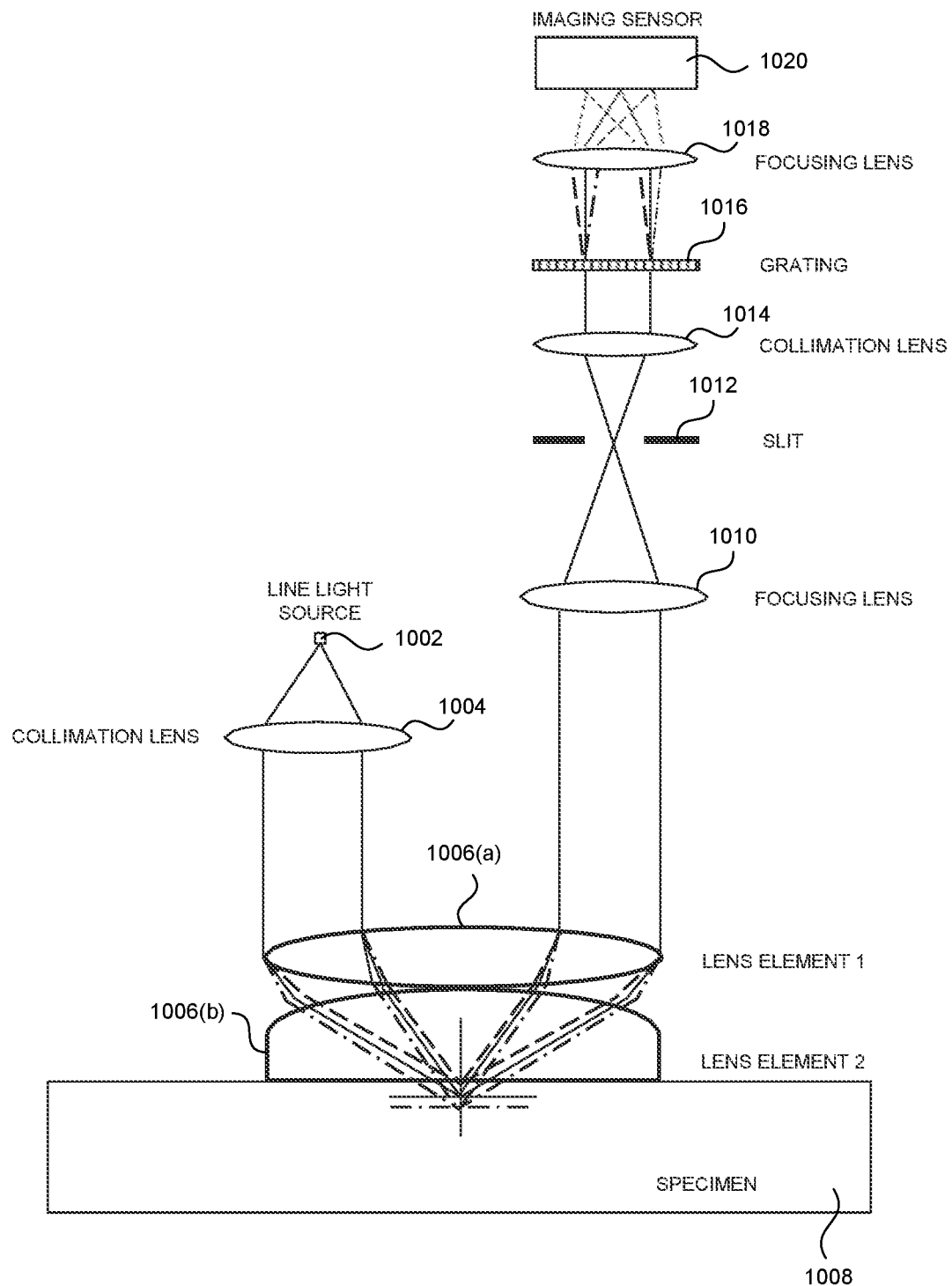
FIG. 10 illustrates a chromatic confocal microscope system with multiple lens elements in accordance with an example embodiment.

FIG. 10 illustrates another example of a chromatic confocal microscope system, where the hyperchromatic objective lens includes two lens elements. The confocal microscope of FIG. 10 includes similar components as those in FIG. 1, namely, a light source 1002, a first collimation lens 1004, a two-element hyperchromatic objective 1006(a), 1006(b) that focuses light of different wavelengths onto different focal planes in a specimen 1008. The confocal microscope of FIG. 10 further includes focusing lens 1010, a slit 1012, a second collimation lens 1014, a grating 1016, a second focusing lens 1018 and an imaging sensor 1020. In this configuration, hyperchromatic objective lens includes a first elements 1006(a) and a second element 1006(b) which may be a plano-convex lens so that the flat surface of the second element 1006(b) is in direct contact with the specimen 1008. This configuration obviates the need to maintain an immersion medium between the objective lens 1006(a), 1006(b) and specimen 1008 (which can be used with some embodiments disclosed herein), which eases the clinical utilization of the device and reduces risk of having a degraded image quality, often caused by loss of immersion medium.

Figure 11A:
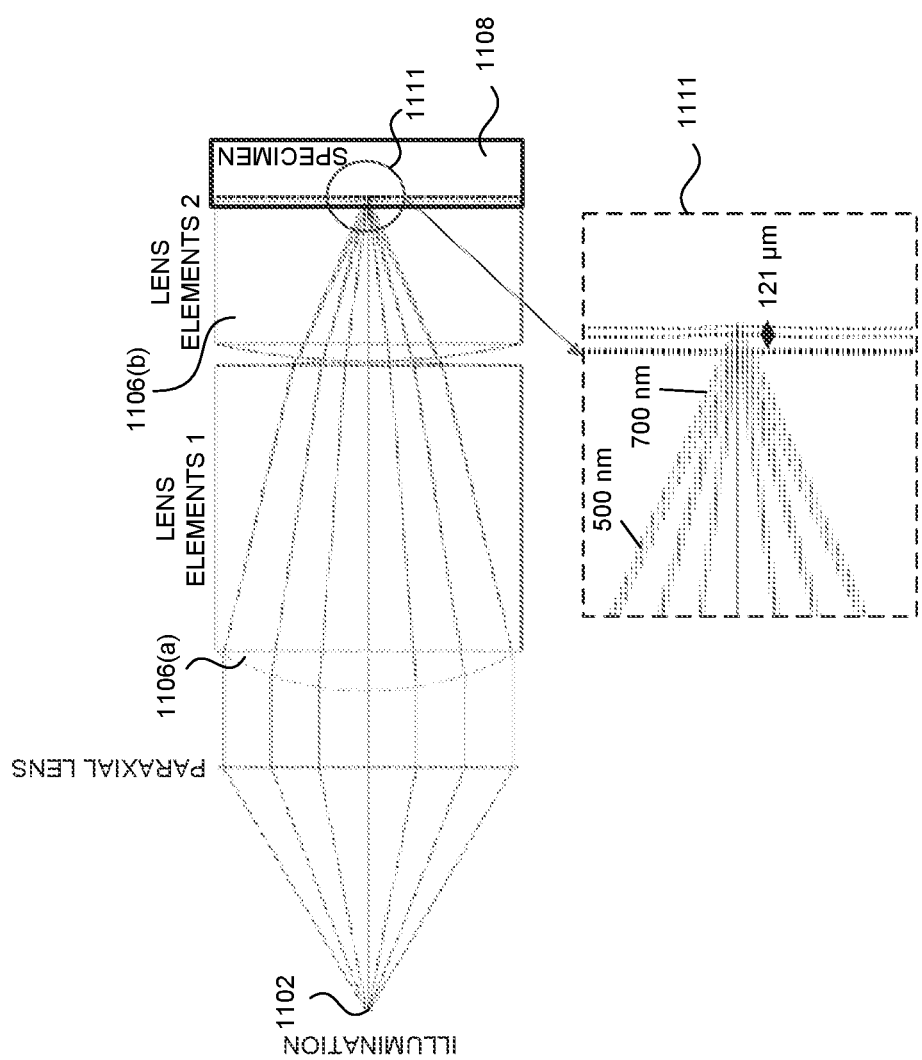
FIG. 11A illustrates a two-element hyperchromatic lens in accordance with an example embodiment.
Figure 11B:
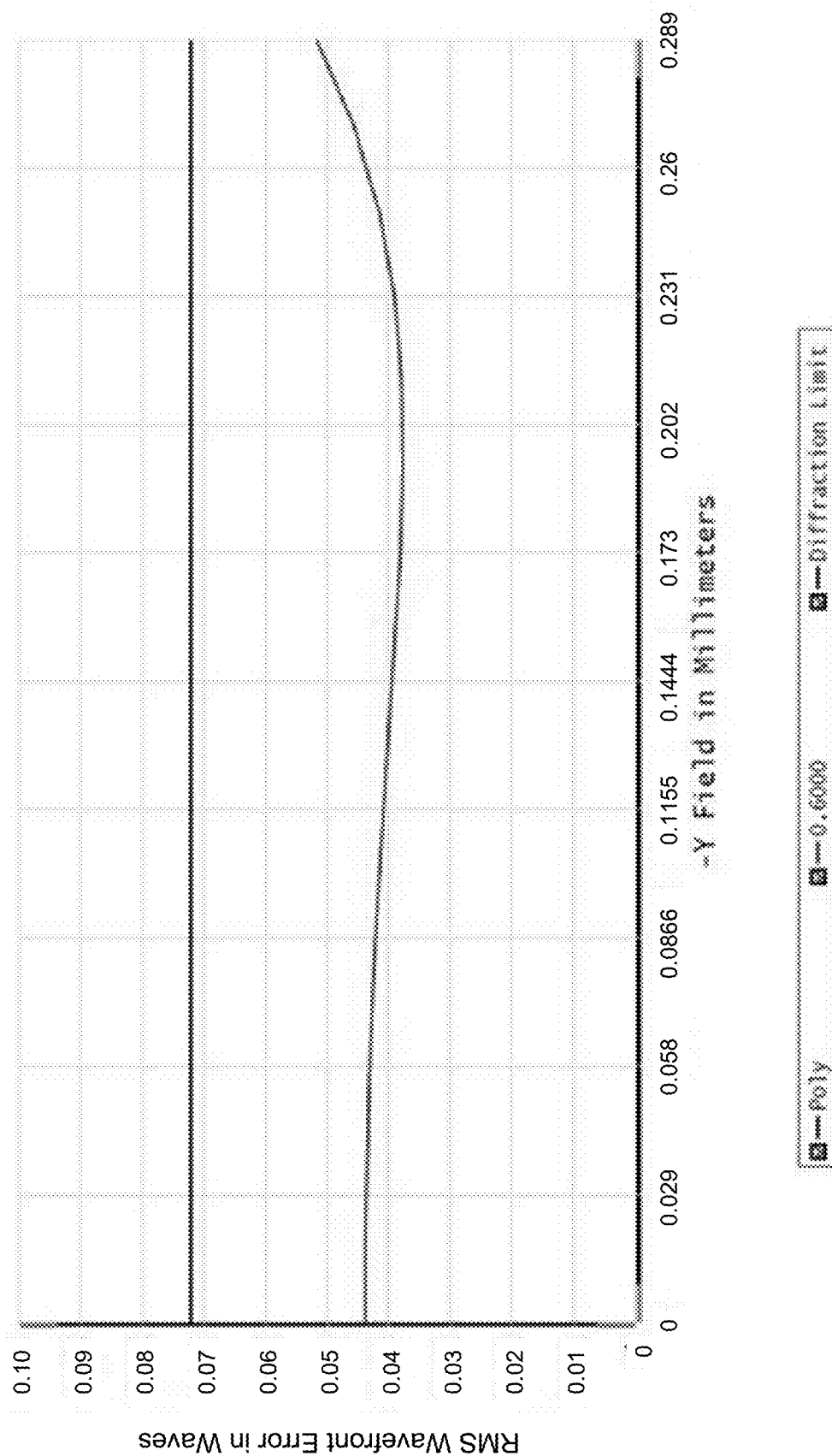
FIG. 11B illustrates an example root mean square wavefront error plot associated with the example hyperchromatic lens of FIG. 11A.

FIGS. 11A and 11B illustrate an example design of a chromatic confocal microscope system where the objective lens system uses two lens elements in accordance with the disclosed technology. As shown in FIG. 11A, an aspheric singlet 1106(a) is used as the lens element 1 to receive light from the light source 1102, and a spherical plano-convex singlet 1106(b) is used as the lens element 2. High-dispersion glass, K-PSFN2 (Sumita Optical Glass, Inc), is used for the lens element 1 and lower-dispersion glass, BK7 (Schott), is used for the lens element 2. The element 2, BK7 spherical plano-convex lens 1106(b), can be manufactured at low cost with standard polishing methods. The example objective lens achieves the imaging depth range of 121 µm for the spectral range of 500-700 nm, as illustrated in the inset 1111. Numerical aperture is 0.6 and the diffraction-limited FOV of 578 µm is achieved. FIG. 11B illustrates the RMS wavefront error versus field for the hyperchromatic lens of FIG. 11A. Many variations to the parameters of the objective lens are possible, in accordance with the values and ranges disclosed herein.

Figure 12A:
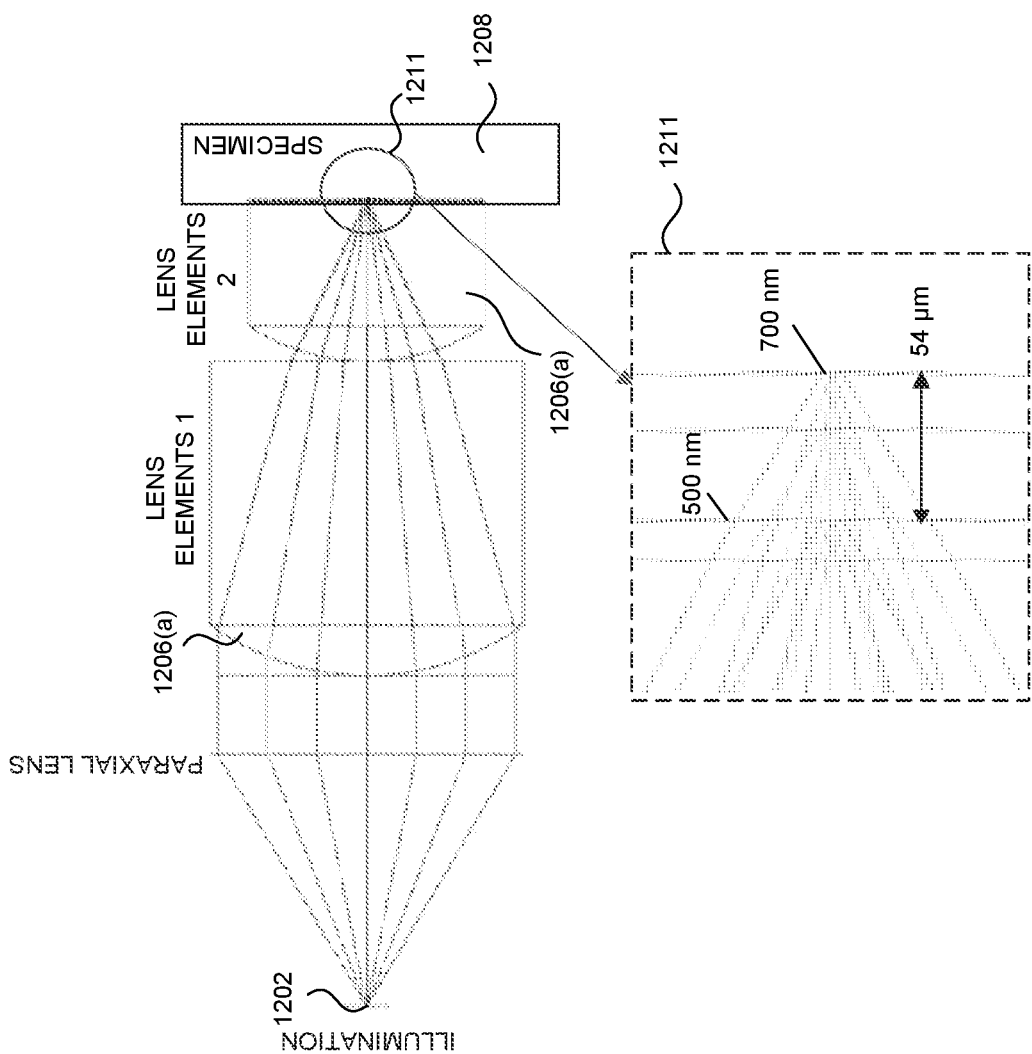
FIG. 12A illustrates a two-element hyperchromatic lens in accordance with another example embodiment.
Figure 12B:
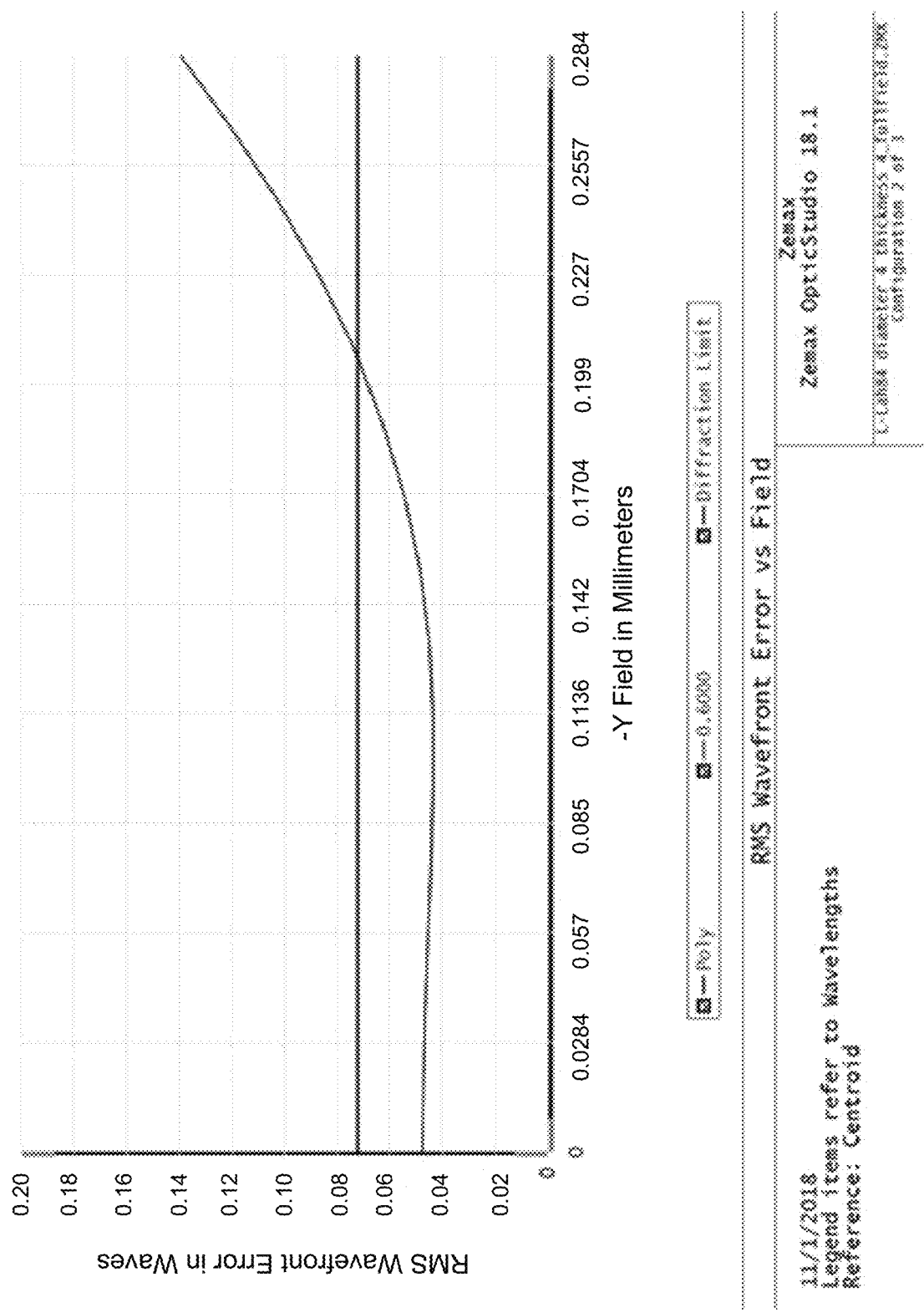
FIG. 12B illustrates an example root mean square wavefront error plot associated with the example hyperchromatic lens of FIG. 12A.

FIGS. 12A and 12B illustrate another example objective lens design that uses two lens elements in accordance with the disclosed technology. In this example design, an aspheric singlet 1206(a) is used as the lens element 1 to receive light from the light source 1202, and a spherical plano-convex singlet 1206(b) is used as the lens element 2. High-dispersion glass, L-LAH84 (Ohara Inc), is used for the element 1 and lower-dispersion glass, BK7 (Schott), is used for the element 2. The refractive index of L-LAH84 at 600 nm is 1.81 and Abbe number 40.55. The element 2, BK7 spherical plano-convex lens, can be manufactured at low cost with standard polishing methods. The example objective lens has a diameter of 4 mm and a focal length of 3 mm. This achieves the imaging depth range of 54 µm for the spectral range of 500-700 nm, as illustrated in the inset 1211. Numerical aperture is 0.63 and the diffraction-limited FOV of 412 µm is achieved. FIG. 12B illustrates the RMS wavefront error versus field for the hyperchromatic lens of FIG. 12A.

Figure 13A:
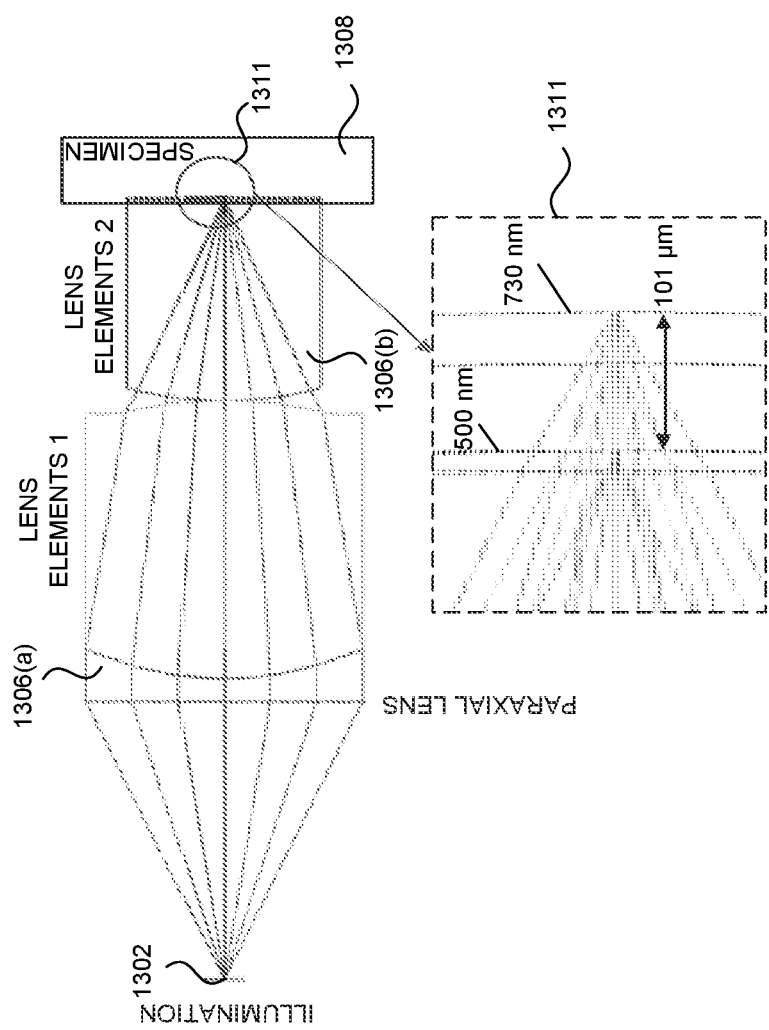
FIG. 13A illustrates a two-element hyperchromatic lens in accordance with another example embodiment.
Figure 13B:
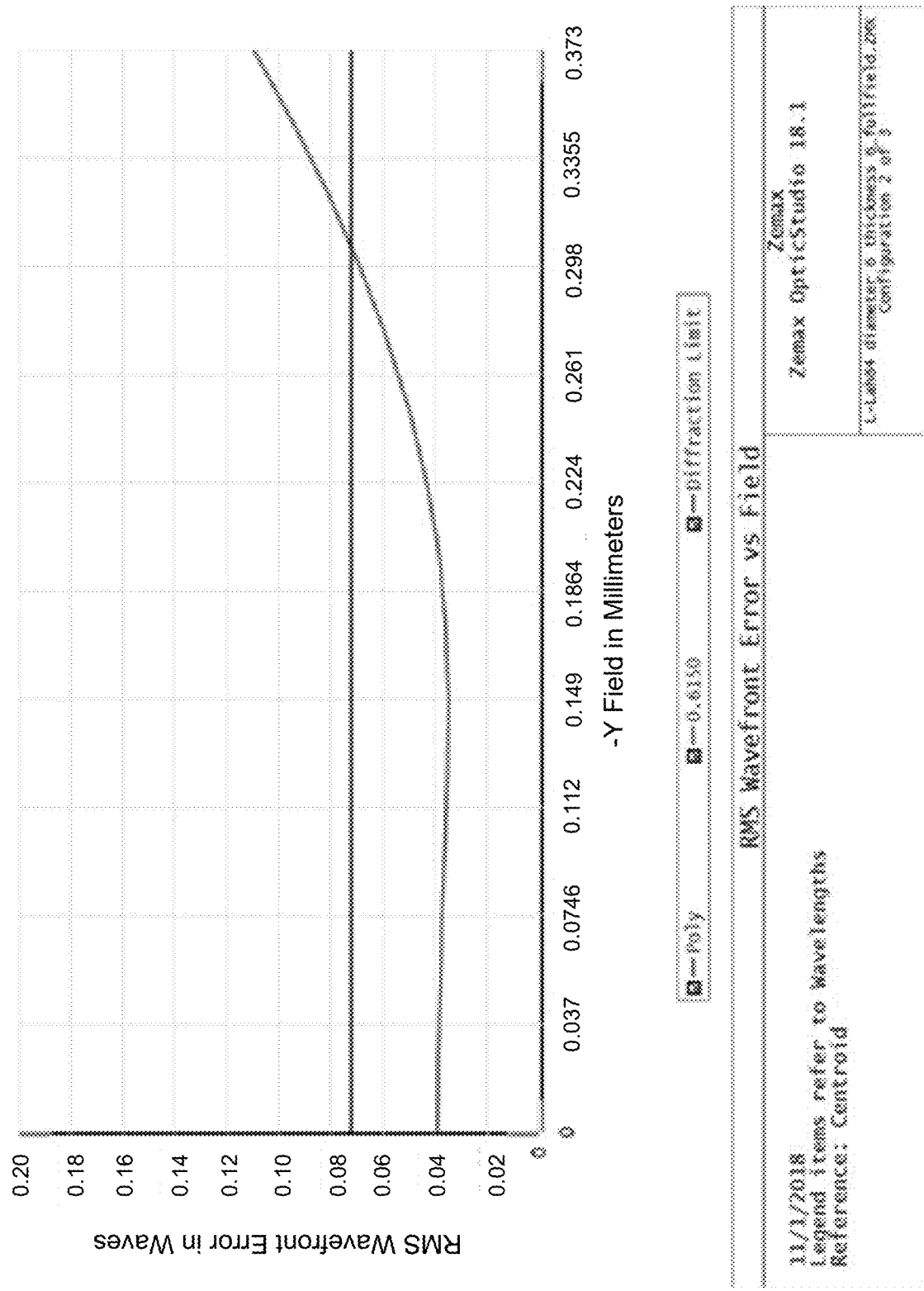
FIG. 13B illustrates an example root mean square wavefront error plot associated with the example hyperchromatic lens of FIG. 13A.

FIGS. 13A and 13B illustrate another example of the objective lens design using two lens elements in accordance with the disclosed technology. With the same material used for the design of FIG. 12A (L-LAH84 for the first objective lens element 1306(a) that receives the light from the light source 1306, and BK7 for the first objective lens element 1306(b)), the objective lens diameter is increased to 6 mm and the focal length to 4.8 mm. For the wavelength range of 500-730 nm, the imaging depth range is 101 µm, as illustrated in the inset 1311. The numerical aperture is 0.625 and the diffraction-limited FOV of 606 µm is achieved. FIG. 13B illustrates the RMS wavefront error versus field for the hyperchromatic lens of FIG. 13A.

Figure 14:
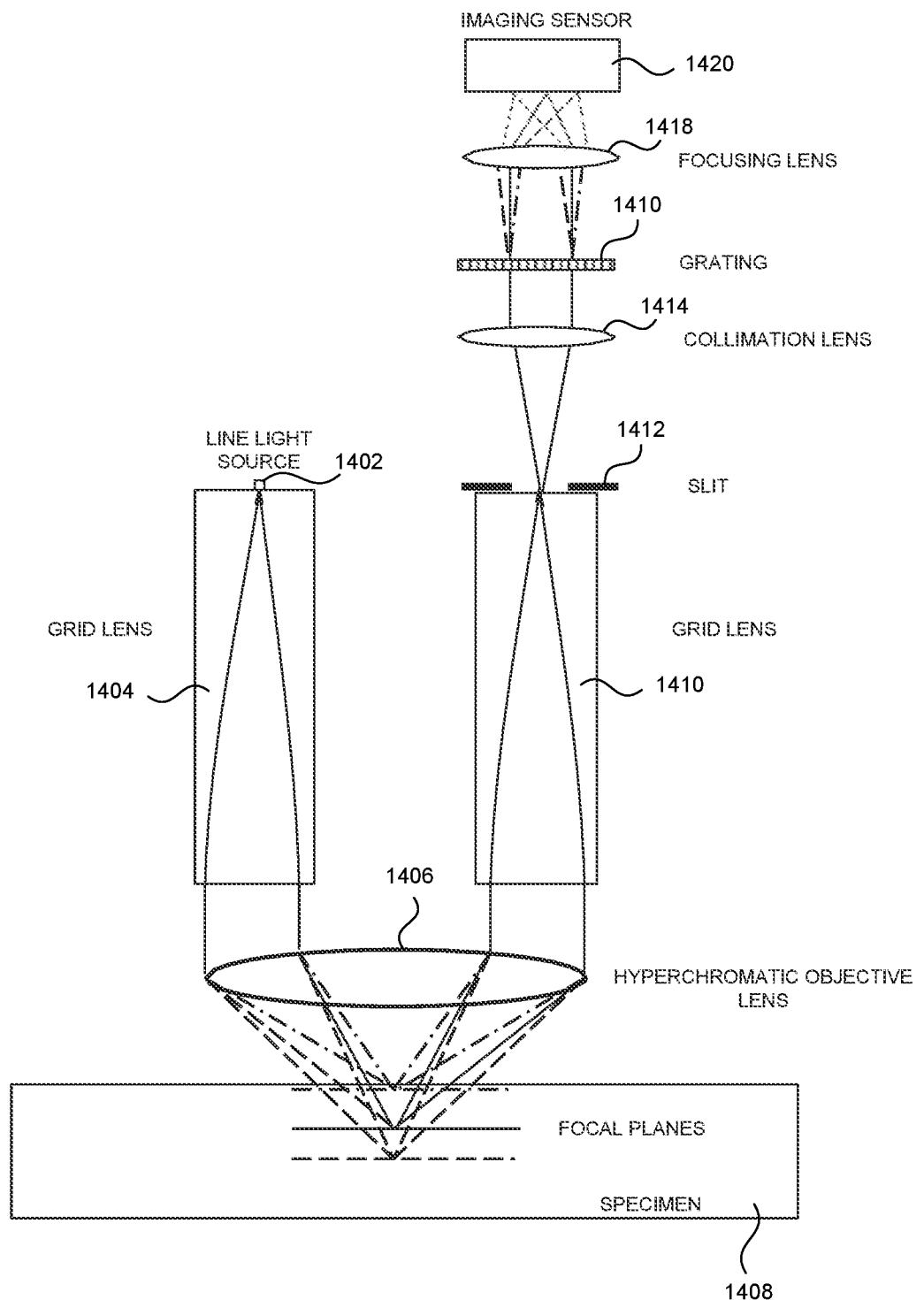
FIG. 14 illustrates a chromatic confocal microscope system including multiple gradient index (GRIN) lenses in accordance with an example embodiment.

FIG. 14 illustrates another example embodiment of a chromatic confocal microscope system, where gradient index (GRIN) lenses are used as the collimation and focusing lenses. The confocal microscope of FIG. 14 includes similar components as those in FIG. 1, namely, a light source 1402, a hyperchromatic objective 1406 that focuses light of different wavelengths onto different focal planes in a specimen 1408. The confocal microscope of FIG. 14 further includes a slit 1412, a second collimation lens 1414, a grating 1416, a second focusing lens 1418 and an imaging sensor 1420. The confocal microscope of FIG. 14, however, includes a first GRIN lens 1404 replaces the collimation lens 104 of FIG. 1, and a second GRIN lens 1410 replaces the focusing lens 110 of FIG. 1. Use of the GRIN lenses can ease the fabrication of the chromatic confocal microscope system due to the longer physical lengths of the GRIN lenses than those of non-GRIN lenses, which allows for easier and more reliable alignment of the GRIN lenses.

Figure 15:
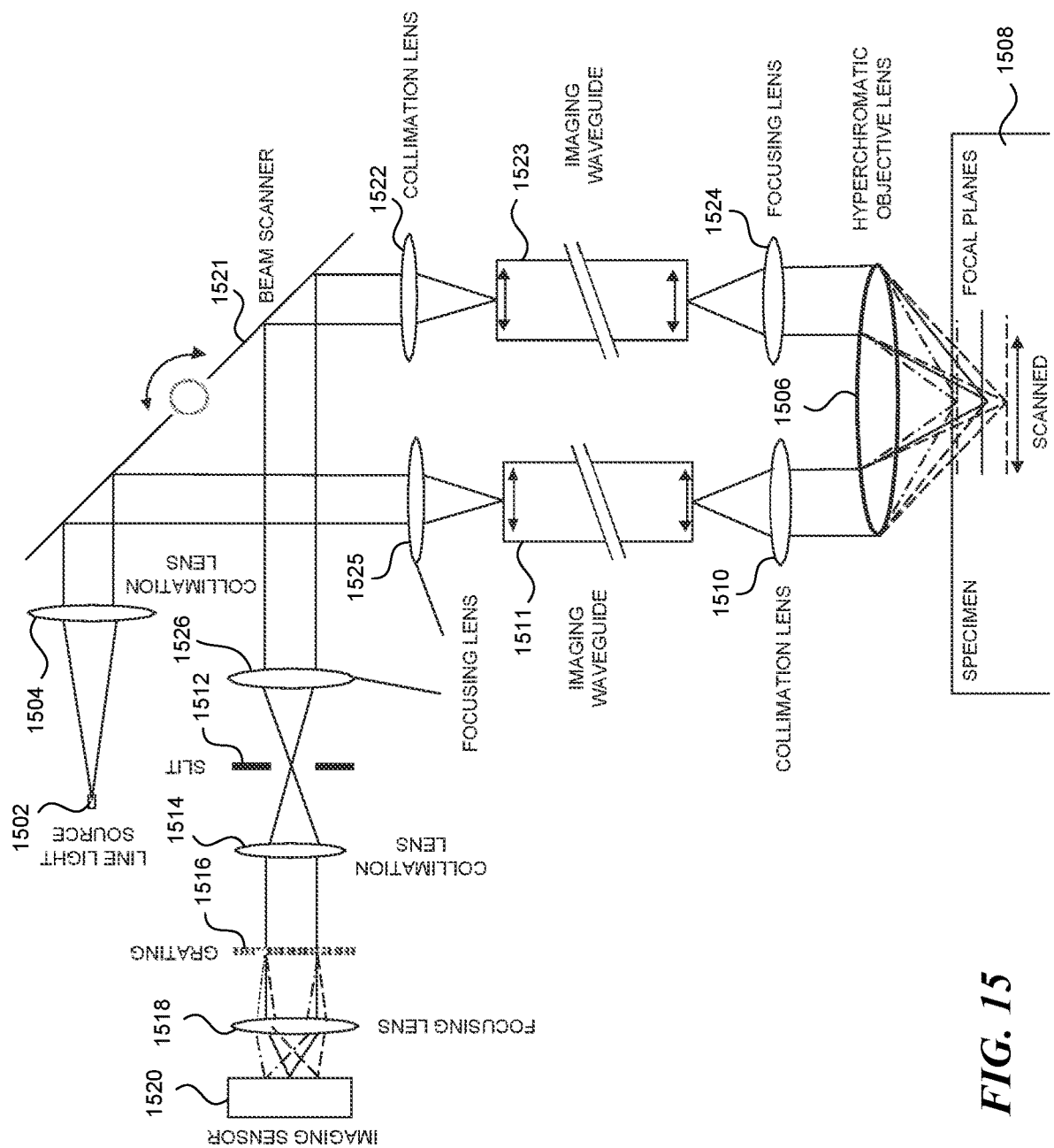
FIG. 15 illustrates a chromatic confocal microscope system for three-dimensional imaging including a beam scanner in accordance with an example embodiment.

FIG. 15 illustrates another example of a chromatic confocal microscope system in accordance with the disclosed technology that enables three-dimensional confocal endoscopic imaging. The confocal microscope of FIG. 14 includes similar components as those described in connection with previous figures including a light source 1502, a collimation lens 1504, a hyperchromatic objective 1506 that focuses light of different wavelengths onto different focal planes in a specimen 1508, a focusing lens 1510, a detection slit 1512 followed by a collimation lens 1514, a grating 1516, another focusing lens 1518 and an imaging sensor 1520. The confocal microscope of FIG. 15 further includes two imaging waveguides 1511, 1523, as well as an additional collimation lens 1522 and focusing lenses 1524, 1525, 1526. Notably, the confocal microscope of FIG. 15 includes a beam scanner 1522. In this configuration, a line illumination may be formed on the proximal end of the first imaging waveguide 1511 and relayed to the distal optics. A beam scanner 1521 may be used to change the line illumination location on the proximal end of the first imaging waveguide 1511 and to subsequently scan the line illumination on the specimen 1508 along the transverse direction, as shown by the double-arrow in FIG. 15. Light reflected back from the specimen 1508 may be focused on the distal end of the second imaging waveguide 1523. The reflected light may then be delivered to the proximal end of the second imaging waveguide 1523 and collimated by the collimation lens 1522. The collimated beam may then be de-scanned by the beam scanner 1521 and focused to a stationary line by the focusing lens 1526 and filtered by the detection slit 1512. Multiple cross-sectional confocal images of the specimen are obtained while the beam angle is scanned, which constitutes three-dimensional confocal images of the specimen.

Figure 16:
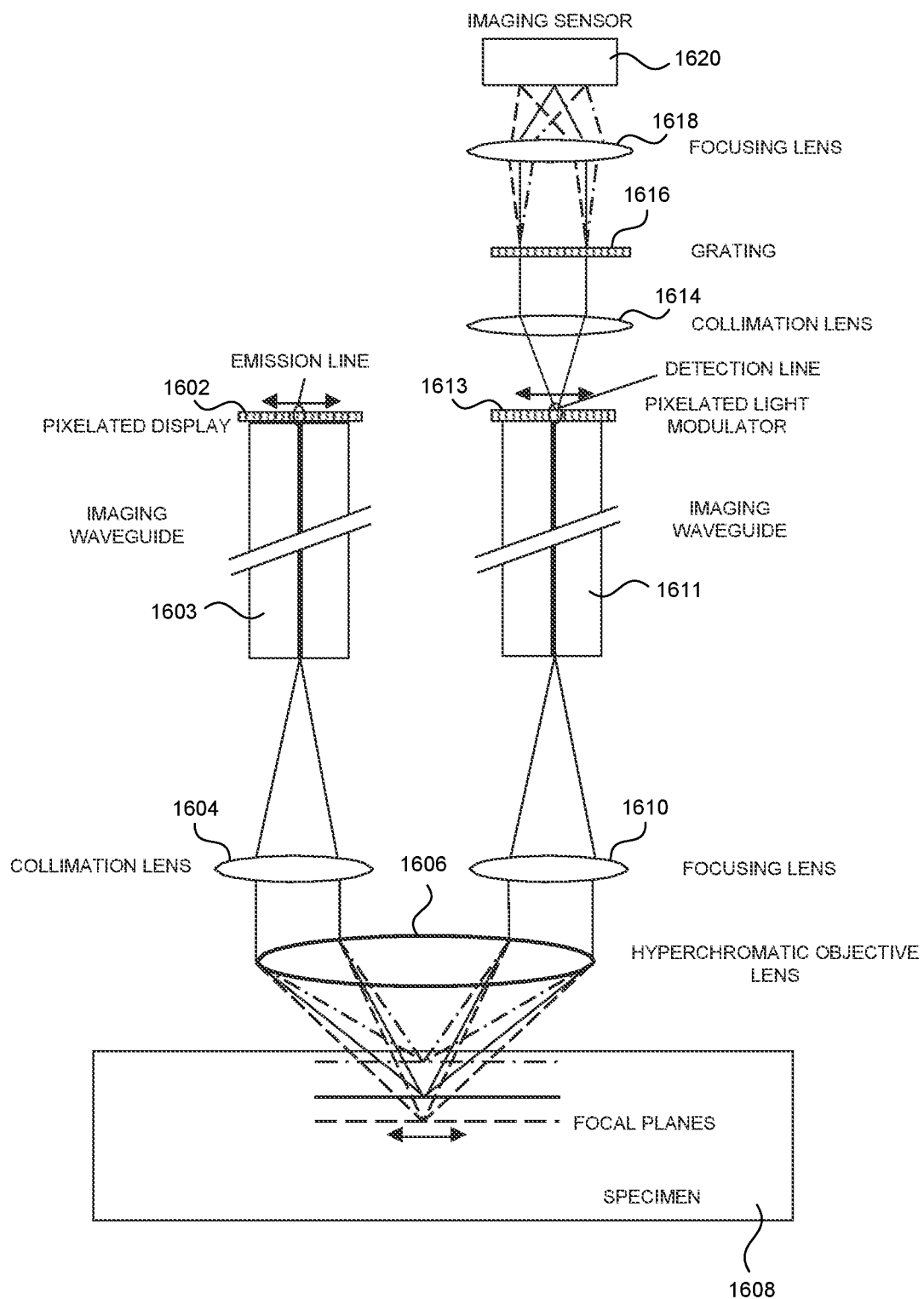
FIG. 16 illustrates a chromatic confocal microscope system for three-dimensional imaging including pixelated display and modulator devices in accordance with an example embodiment.

FIG. 16 illustrates another example of a confocal microscope system that can conduct three-dimensional confocal endoscopic imaging without using any moving parts in accordance with the disclosed technology. In this embodiment, a pixelated display, such as organic LED (OLED) and liquid crystal display (LCD), is used as the light source 1602. A thin line on the pixelated display may be activated to emit light, which works as a line light source entering a first imaging waveguide 1603 for delivery to specimen 1608. Light reflected back from the specimen 1608 may then be imaged on the distal end of a second imaging waveguide 1611 and delivered to its proximal end. On the proximal end of the second imaging waveguide 1611, a pixelated light modulator 1613, such as a liquid crystal (LC) or deformable mirror device (DMD), may be used to allow only a thin line region to pass the light through. The pass region essentially works as a detection slit. By synchronously changing the light source 1602 illumination line position on the pixelated display and the detection line position on the pixelated light modulator 1613, cross-sectional confocal images may be obtained from different transverse points to generate three-dimensional confocal data. The remaining components of FIG. 16 are similar to those in the previous figures and include a collimation lens 1604, a hyperchromatic objective 1606 that focuses light of different wavelengths onto different focal planes in a specimen 1608, a focusing lens 1610, a collimation lens 1614, a grating 1616, another focusing lens 1618 and an imaging sensor 1620.

One example chromatic confocal microscope disclosed herein uses a hyperchromatic objective lens. In some embodiments, the light beam entering the hyperchromatic objective lens is generally collimated for the entire imaging spectrum, which can result in low spherical aberration, so that imaging performance may be improved. In some embodiments, an aspheric singlet may be used as the objective lens. In other embodiments, an aspheric singlet may be one of two lens elements of the objective lens. Advantageously, the use of fewer components for the objective lens may reduce the cost, size, and complexity of the microscopy optics, which can make the chromatic confocal microscope system suitable for endoscopic devices.

One aspect of the disclosed embodiments relates to a chromatic confocal microscope system that includes a hyperchromatic objective lens, a light source configured to output light having a range of different wavelengths, and collimating optics configured to collimate the light of different wavelengths from the light source and to deliver the collimated light to the hyperchromatic objective lens. The hyperchromatic objective lens is configured to focus the light of different wavelengths onto different corresponding depths in a sample.

In one example embodiment, the hyperchromatic objective lens comprises an aspheric singlet lens. In another example embodiment, the hyperchromatic objective lens further comprises a high dispersion material with an Abbe number of about 50 or less. The hyperchromatic objective lens can be configured to produce chromatic aberration of at least about 50 microns for the light of different wavelengths. In some example embodiments, the hyperchromatic objective lens comprises a single lens element. In other example embodiments, the hyperchromatic objective lens comprises a plurality of lens elements comprising at least one aspheric lens element. In one particular example, the objective lens comprises a second lens element that is plano-convex and configured so that the plane surface contacts the sample.

In some example embodiments, the hyperchromatic objective lens has a numerical aperture that is between about 0.4 and about 0.8. In some embodiments, the focal length of the hyperchromatic objective lens is between about 4 mm and about 8 mm. In still other example embodiments, light from the light source comprises light with a range of wavelengths between about 500 nm and about 1400 nm. In one example embodiment, the detection optics is configured to receive light reflected from the sample. For example, the detection optics comprise at least one focusing lens, a detection slit, a collimating lens, and a grating. The detection optics can also comprise a grating, at least one focusing lens, and a linear variable filter. In still other example embodiments, the detection optics comprise a dispersive element.

In another example embodiment, the collimating optics comprise a collimating lens. In yet another example embodiment, the system further comprises at least one waveguide. In one example embodiment, the system further comprises at least one optical fiber. In another example embodiment, the collimating optics comprise a GRIN lens. In still other example embodiments, the detection optics comprise a GRIN lens, a detection slit, a collimating lens, a grating, and at least one focusing lens. In some embodiments, the light source is a line light source. In still another example embodiment, the light line source comprises a light source and an illumination slit. According to yet another example embodiment, the light line source comprises a point source and a cylindrical lens.

In some embodiments, the light source comprises a plurality of light source elements that can be selectively illuminated, and the hyperchromatic objective lens is configured to focus light from the light source onto different areas of the sample depending on which of the light source elements are illuminated. According to some embodiments, the hyperchromatic objective lens is configured to focus light of a first wavelength at a first depth and to focus light of a second wavelength at a second depth, where the first wavelength is greater than the second wavelength, and where the first depth is greater than the second depth. In some embodiments, the above noted system is part of an endoscopic device.

Another aspect of the disclosed embodiments relates to a confocal microscope system for imaging a sample that includes a light source comprising a plurality of light source elements that can be selectively illuminated, and an objective lens configured to focus light from the light source onto different areas of the sample depending on which of the light source elements are illuminated. In one example embodiment, the light source comprises a pixelated display and the light source elements comprise pixels of the pixelated display. In another example embodiment, the system includes collimating optics configured to collimate light from the light source and to deliver the collimated light to the objective lens. In still other example embodiments, the system includes detection optics configured to receive light reflected by the sample. For example, the detection optics can include a pixelated light modulator with a plurality of modulator pixels which can be selectively modulated to block some light and to transmit other light.

Another aspect of the disclosed embodiments relates to a method of operating the disclosed confocal microscopes. The includes illuminating a first subset of the light source elements to illuminate a first area of the sample, modulating a first subset of the modulator pixels to transmit light reflected from the first area of the sample, illuminating a second subset of the light source elements to illuminate a second area of the sample, and modulating a second subset of the modulator pixels to transmit light reflected from the second area of the sample.

Another aspect of the disclosed embodiments relates to a chromatic confocal microscope system that includes a hyperchromatic objective lens, collimating optics positioned to received light from a light source, to collimate the light of different wavelengths from the light source and to deliver the collimated light to the hyperchromatic objective lens. The hyperchromatic objective lens is configured to focus the light of different wavelengths onto different corresponding focal planes that are separated from one another within a sample object. The chromatic confocal microscope system further includes focusing optics positioned to receive multispectral light reflected from the sample object after passing through the hyperchromatic objective lens, a detection slit positioned to receive light from the focusing optics and to block at least a portion of light that is incident thereon, and a grating positioned to receive light after passing through the detection slit and to produce spatially separated light of different wavelengths to enable the detection of the spatially separated light by an imaging sensor.

In one example embodiment, the chromatic confocal microscope system further includes the light source that is one of a point source or a line source. In another example embodiment, the system further includes the imaging sensor that can include, for example, a CCD or a CMOS sensor. In yet another example embodiment, the system further includes a collimation lens positioned to receive light from the detection slit and provide collimated light to the grating, a focusing lens positioned to receive the spatially separated light from the grating and produce focused light for detection by the imaging sensor. In still another example embodiment, the system further includes a first prism positioned at a first side of the grating and a second prism positioned at a second side of the grating.

According to another example embodiment, the chromatic confocal microscope system further includes a first imaging waveguide positioned to receive light from the light source and to allow light to propagate therethrough for (a) delivery to the collimation optics and (b) delivery to an imager. In one example embodiment, the system further includes an illumination slit positioned to receive light from the light source that is an extended source, and to produce a narrow output light for delivery to the collimation optics. In another example embodiment, the system also includes a non-imaging waveguide positioned to receive light from the extended source and to deliver light to the illumination slit. In another example embodiment, the chromatic confocal microscope system further includes an imaging waveguide positioned to receive light after passing through the detection slit and to allow light to propagate therethrough for (a) delivery to the collimation optics and (b) delivery to an imager.

In one example embodiment, a dispersive element is further positioned to receive the multi-spectral light reflected from the sample object after passing through the hyperchromatic objective lens and to correct a tilted axis of the multi-spectral. In some example embodiments, the dispersive element is a grating or a prism. In some example embodiments, the hyperchromatic objective lens comprises a first lens and a second lens. For example, the second lens can be a plano-convex lens, where a planar surface of the second lens is positioned to contact the sample object. In still other example embodiments, one or both of the focusing optics include a graded index (GRIN) lens. In one example embodiment, the hyperchromatic objective lens comprises an aspheric singlet lens. In some example embodiments, the hyperchromatic objective lens is configured to produce focused light at the focal planes that are separated from one another in the range of about 50 microns to about 120 microns.

Another aspect of the disclosed embodiments relates to a chromatic confocal microscope system that includes a hyperchromatic objective lens, and collimating optics positioned to received light from a light source, to collimate the light of different wavelengths from the light source and to deliver the collimated light to the hyperchromatic objective lens. The hyperchromatic objective lens is configured to focus the light of different wavelengths onto different corresponding focal planes that are separated from one another within a sample object. The chromatic confocal microscope system further includes a grating positioned to receive multi-spectral light reflected from the sample object after passing through the hyperchromatic objective lens and to produce spatially separated light of different wavelength, a focusing lens positioned to receive the spatially separated light of different wavelength, and a linear variable filter comprising a plurality of spectral filters in different spatial locations thereof. The focusing lens and the linear variable filter are positioned to allow light having a particular spectral content to be focused by the focusing lens on a corresponding spectral filter of the linear variable filter that allows the light having the particular spectral content to pass therethrough, and to thereby enable the detection of spatially separated light by an imaging sensor. In one example embodiment, the chromatic confocal microscope system further includes a first prism positioned at a first side of the grating and a second prism positioned at a second side of the grating.

Another aspect of the disclosed embodiments relates to a three-dimensional (3D) chromatic confocal microscope system that includes a hyperchromatic objective lens, collimating optics positioned to received light from a light source, and a rotatable beam scanner. The collimating optics is configured to collimate the light of different wavelengths from the light source and to deliver the collimated light to the rotatable beam scanner; the hyperchromatic objective lens is configured to receive the collimated light from the collimating optics and to focus the light of different wavelengths onto different corresponding focal planes that are separated from one another within a sample object. The 3D chromatic confocal microscope system further includes focusing optics positioned to receive multi-spectral light reflected from the sample object after passing through the hyperchromatic objective lens and to deliver the received multi-spectral light to the beam scanner, a detection slit positioned to receive light from the focusing optics and to block at least a portion of light that is incident thereon, and a grating positioned to receive light after passing through the detection slit and to produce spatially separated light of different wavelengths to enable the detection of the spatially separated light by an imaging sensor.

In some example embodiments, the collimating optics include a first collimating lens positioned to direct the collimated light to the rotatable beam scanner, a focusing lens positioned to receive the collimated light after reflection from the rotatable beam scanner, an imaging waveguide positioned to receive focused light from focusing lens at a first end thereof, and a second collimating lens positioned to receive light from a second end of the imaging waveguide and to direct the collimated light hyperchromatic objective lens. In another example embodiment, the focusing optics include a first focusing lens positioned receive the multi-spectral light reflected from the sample object after passing through the hyperchromatic objective lens, an imaging waveguide positioned to receive focused light from first focusing lens at a first end thereof, a collimating lens to receive light from second end of the imaging waveguide and to direct the collimated light to the rotatable beam scanner, and a second focusing lens positioned to receive the collimated light after reflection from the rotatable beam scanner.

Another aspect of the disclosed embodiments relates to a chromatic confocal microscope system that includes a pixelated light source configured to produce light having different spectral contents controllable at each pixel location or a set of pixel locations, a hyperchromatic objective lens, and collimating optics positioned to received light from the pixelated light source, to collimate the light of different wavelengths and to deliver the collimated light to the hyperchromatic objective lens. The hyperchromatic objective lens is configured to focus the light of different wavelengths onto different corresponding focal planes that are separated from one another within a sample object. The chromatic confocal microscope system further includes focusing optics positioned to receive multi-spectral light reflected from the sample object after passing through the hyperchromatic objective lens, and a pixelated light modulator positioned to receive the multi-spectral light. The pixelated light modulator includes a plurality of pixels, wherein each pixel or set of pixels of the pixelated light modulator is configured to be modulated to allow a particular wavelength, or set of wavelengths, of light to pass therethrough. The chromatic confocal microscope system further includes a grating positioned to receive light after passing through the pixelated light modulator and to produce spatially separated light of different wavelengths to enable the detection of the spatially separated light by an imaging sensor.

In some example embodiments, the chromatic confocal microscope system further includes a first imaging waveguide positioned to receive light from the pixelated light source and to allow light to propagate therethrough for delivery to the collimation optics, and a second imaging waveguide positioned to receive light after passing through the focusing optics and to allow light to propagate therethrough for delivery to the pixelated light modulator. In another example embodiment, the chromatic confocal microscope system also includes a collimation lens positioned to receive light from the pixelated light modulator and provide collimated light to the grating, and a focusing lens positioned to receive the spatially separated light from the grating and produce focused light for detection by the imaging sensor.

It is understood that the various disclosed embodiments may be implemented individually, or collectively, in devices comprised of various optical components, electronics hardware and/or software modules and components. For example, electronic components may be configured to control the operations of various electronic devices, such as pixelated displays, modulators, light sources and/or imaging sensors. These devices, for example, may comprise a processor, a memory unit, an interface that are communicatively connected to each other, and may range from desktop and/or laptop computers, to mobile devices and the like. The processor and/or controller can be in communication with at least one memory and with at least one communication unit that enables the exchange of data and information, directly or indirectly, through the communication link with other entities, devices and networks. The communication unit may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The sequence of operations described in this document represents examples of corresponding operations for implementing the methods described and can be reordered. The features of the embodiments described herein may be combined in all possible combinations of methods, apparatus, modules and systems.

What is claimed is:

1. A three-dimensional (3D) chromatic confocal microscope system, comprising:
    a hyperchromatic objective lens;
    collimating optics positioned to receive light from a light source;
    a rotatable beam scanner, wherein
        the collimating optics is configured to collimate light of different wavelengths from the light source and to deliver the collimated light to the rotatable beam scanner, and
        the hyperchromatic objective lens is configured to receive the collimated light from the collimating optics and to focus the light of different wavelengths onto different corresponding focal planes that are separated from one another within a sample object;
    focusing optics positioned to receive multi-spectral light reflected from the sample object after passing through the hyperchromatic objective lens and to deliver the received multi-spectral light to the beam scanner;
    a detection slit positioned to receive light from the focusing optics and to block at least a portion of light that is incident thereon; and
    a grating positioned to receive light after passing through the detection slit and to produce spatially separated light of different wavelengths to enable the detection of the spatially separated light by an imaging sensor, wherein the collimating optics include:
    a first collimating lens positioned to direct the collimated light to the rotatable beam scanner,
    a focusing lens positioned to receive the collimated light after reflection from the rotatable beam scanner,
    an imaging waveguide positioned to receive focused light from the focusing lens at a first end thereof, and
    a second collimating lens positioned to receive light from a second end of the imaging waveguide and to direct to the collimated light hyperchromatic objective lens.

2. The 3D chromatic confocal microscope system of claim 1, further comprising the light source that is one of a point source or a line source.

3. The 3D chromatic confocal microscope system of claim 1, further comprising the imaging sensor.

4. The 3D chromatic confocal microscope system of claim 1, further comprising:
    a third collimating lens positioned to receive light from the detection slit and provide collimated light to the grating; and
    another focusing lens positioned to receive the spatially separated light from the grating and produce focused light for detection by the imaging sensor.

5. The 3D chromatic confocal microscope system of claim 1, wherein the hyperchromatic objective lens comprises a first lens and a second lens.

6. The 3D chromatic confocal microscope system of claim 5, wherein the second lens is a plano-convex lens and a planar surface of the second lens is positioned to contact the sample object.

7. The 3D chromatic confocal microscope system of claim 1, wherein the hyperchromatic objective lens comprises an aspheric singlet lens.

8. The 3D chromatic confocal microscope system of claim 1, wherein the hyperchromatic objective lens comprises a high dispersion material with an Abbe number of about 50 or less.

9. The 3D chromatic confocal microscope system of claim 1, wherein the hyperchromatic objective lens has a numerical aperture that is between about 0.4 and about 0.8.

10. The 3D chromatic confocal microscope system of claim 1, wherein light from the light source comprises light with a range of wavelengths between about 500 nm and about 1400 nm.

11. The 3D chromatic confocal microscope system of claim 1, wherein hyperchromatic objective lens is configured to produce focused light at the focal planes that are separated from one another in the range of about 50 microns to about 120 microns.

12. A three-dimensional (3D) chromatic confocal microscope system, comprising:
    a hyperchromatic objective lens;
    collimating optics positioned to receive light from a light source;
    a rotatable beam scanner, wherein
        the collimating optics is configured to collimate light of different wavelengths from the light source and to deliver the collimated light to the rotatable beam scanner, and
        the hyperchromatic objective lens is configured to receive the collimated light from the collimating optics and to focus the light of different wavelengths onto different corresponding focal planes that are separated from one another within a sample object;
    focusing optics positioned to receive multi-spectral light reflected from the sample object after passing through the hyperchromatic objective lens and to deliver the received multi-spectral light to the beam scanner;

a detection slit positioned to receive light from the focusing optics and to block at least a portion of light that is incident thereon; and a grating positioned to receive light after passing through the detection slit and to produce spatially separated light of different wavelengths to enable the detection of the spatially separated light by an imaging sensor, wherein the focusing optics include:

a first focusing lens positioned receive the multi-spectral light reflected from the sample object after passing through the hyperchromatic objective lens, an imaging waveguide positioned to receive focused light from first focusing lens at a first end thereof, a collimating lens to receive light from second end of the imaging waveguide and to direct the collimated light to the rotatable beam scanner, and a second focusing lens positioned to receive the collimated light after reflection from the rotatable beam scanner.

13. The 3D chromatic confocal microscope system of claim 12, wherein the collimating optics include:

a first collimating lens positioned to direct the collimated light to the rotatable beam scanner, a focusing lens positioned to receive the collimated light after reflection from the rotatable beam scanner, an imaging waveguide positioned to receive focused light from focusing lens at a first end thereof, and a second collimating lens positioned to receive light from a second end of the imaging waveguide and to direct the collimated light hyperchromatic objective lens.

14. A chromatic confocal microscope system, comprising:

a pixelated source configured to produce light having different spectral contents controllable at each pixel location or a set of pixel locations;

a hyperchromatic objective lens;

collimating optics positioned to receive light from the pixelated light source, to collimate light of different wavelengths from the light source and to deliver the collimated light to the hyperchromatic objective lens, wherein the hyperchromatic objective lens is configured to focus the light of different wavelengths onto different corresponding focal planes that are separated from one another within a sample object;

focusing optics positioned to receive multi-spectral light reflected from the sample object after passing through the hyperchromatic objective lens;

a pixelated light modulator positioned to receive the multi-spectral light, the pixelated light modulator including a plurality of pixels, wherein each pixel or set of pixels of the pixelated light modulator is configured to be modulated to allow a particular wavelength, or set of wavelengths, of light to pass therethrough;

a grating positioned to receive light after passing through the pixelated light modulator and to produce spatially separated light of different wavelengths to enable the detection of the spatially separated light by an imaging sensor;

a first imaging waveguide positioned to receive light from the pixelated light source and to allow light to propagate therethrough for delivery to the collimation optics; and a second imaging waveguide positioned to receive light after passing through the focusing optics and to allow light to propagate therethrough for delivery to the pixelated light modulator.

15. The chromatic confocal microscope system of claim 14, further comprising:

a collimation lens positioned to receive light from the pixelated light modulator and provide collimated light to the grating; and a focusing lens positioned to receive the spatially separated light from the grating and produce focused light for detection by the imaging sensor.

16. The chromatic confocal microscope system of claim 14, further comprising the imaging sensor.

17. The chromatic confocal microscope system of claim 14, wherein the hyperchromatic objective lens comprises a first lens and a second lens.

18. The chromatic confocal microscope system of claim 17, wherein the second lens is a plano-convex lens and a planar surface of the second lens is positioned to contact the sample object.

19. The chromatic confocal microscope system of claim 14, wherein the hyperchromatic objective lens comprises an aspheric singlet lens.

20. The chromatic confocal microscope system of claim 14, wherein the hyperchromatic objective lens comprises a high dispersion material with an Abbe number of about 50 or less.

21. The chromatic confocal microscope system of claim 14, wherein the hyperchromatic objective lens has a numerical aperture that is between about 0.4 and about 0.8.

22. The chromatic confocal microscope system of claim 14, wherein light from the light source comprises light with a range of wavelengths between about 500 nm and about 1400 nm.

23. The chromatic confocal microscope system of claim 14, wherein hyperchromatic objective lens is configured to produce focused light at the focal planes that are separated from one another in the range of about 50 microns to about 120 microns.

* * * * *